(12) United States Patent
Fan et al.

(10) Patent No.: US 10,965,424 B2
(45) Date of Patent: Mar. 30, 2021

(54) UPLINK CONTROL INFORMATION TRANSMISSION IN AUTONOMOUS UPLINK

(71) Applicant: QUALCOMM Incorporated, San Diego, CA (US)

(72) Inventors: Zhifei Fan, San Diego, CA (US); Xiaoxia Zhang, San Diego, CA (US); Jing Sun, San Diego, CA (US); Tamer Kadous, San Diego, CA (US); Qingjiang Tian, San Diego, CA (US)

(73) Assignee: Qualcomm Incorporated

( * ) Notice: Subject to any disclaimer, the term of this patent is extended or adjusted under 35 U.S.C. 154(b) by 131 days.

(21) Appl. No.: 16/241,660

(22) Filed: Jan. 7, 2019

(65) Prior Publication Data

US 2019/0253219 A1 Aug. 15, 2019

Related U.S. Application Data

(60) Provisional application No. 62/628,830, filed on Feb. 9, 2018.

(51) Int. Cl.
*H04L 5/00* (2006.01)
*H04W 16/14* (2009.01)
(Continued)

(52) U.S. Cl.
CPC ........... *H04L 5/0053* (2013.01); *H04L 5/001* (2013.01); *H04L 5/0037* (2013.01);
(Continued)

(58) Field of Classification Search
None
See application file for complete search history.

(56) References Cited

U.S. PATENT DOCUMENTS

2016/0049999 A1\* 2/2016 Taherzadeh Boroujeni ............... H04L 27/2634 370/335
2016/0352454 A1 12/2016 Zhang et al.
(Continued)

FOREIGN PATENT DOCUMENTS

WO WO-2017039564 A1 3/2017
WO WO-2017142581 A1 8/2017

OTHER PUBLICATIONS

International Search Report and Written Opinion—PCT/US2019/012746—ISA/EPO—dated Apr. 17, 2019.
(Continued)

*Primary Examiner* — Christine T Duong
(74) *Attorney, Agent, or Firm* — Holland & Hart LLP

(57) ABSTRACT

Methods, systems, and devices for wireless communications are described. One method may include receiving, by a user equipment (UE) from a base station, a resource allocation indicator corresponding to a total number of resource elements to allocate for uplink control information within a resource allocation of a shared data channel. The UE may determine anchor resources within the resource allocation, and determine a plurality of transmission parameters for an autonomous uplink transmission based on the total number of resource elements. The UE may transmit, to the base station, the uplink control information within the anchor resources to indicate the plurality of transmission parameters for the autonomous uplink transmission.

30 Claims, 18 Drawing Sheets

(51) Int. Cl.
*H04L 27/20* (2006.01)
*H04W 74/08* (2009.01)

(52) U.S. Cl.
CPC .......... *H04L 5/0092* (2013.01); *H04L 27/206* (2013.01); *H04W 16/14* (2013.01); *H04L 5/0044* (2013.01); *H04W 74/08* (2013.01)

(56) References Cited

U.S. PATENT DOCUMENTS

| | | |
|---|---|---|
| 2017/0215171 A1 | 7/2017 | Sun et al. |
| 2017/0367110 A1 | 12/2017 | Li et al. |
| 2018/0167161 A1* | 6/2018 | Davydov .............. H04L 1/0011 |
| 2018/0338305 A1* | 11/2018 | Han ..................... H04L 1/0073 |

OTHER PUBLICATIONS

Qualcomm Incorporated: "Resource Allocation for Autonomous UL Access", 3GPP Draft; R1-1713026 Resource Allocation for Autonomous UL Access, 3rd Generation Partnership Project (3GPP), Mobile Competence Centre; 650, Route Des Lucioles; F-06921 Sophia-Antipolis Cedex ; France, vol. RAN WG1, No. Prague, Czech; Aug. 21, 2017-Aug. 25, 2017 Aug. 20, 2017, XP051315835, Retrieved from the Internet: URL:http://www.3gpp.org/ftp/Meetings_3GPP_SYNC/RAN1/Docs/ [retrieved on Aug. 20, 2017], p. 1/3, section 2.1, p. 3/3, section 2.4, 4 pages.

* cited by examiner

UPLINK CONTROL INFORMATION TRANSMISSION IN AUTONOMOUS UPLINK

CROSS REFERENCES

The present Application for Patent claims the benefit of U.S. Provisional Patent Application No. 62/628,830 by FAN, et al., entitled "UPLINK CONTROL INFORMATION TRANSMISSION IN AUTONOMOUS UPLINK," filed Feb. 9, 2018, assigned to the assignee hereof, and expressly incorporated herein.

BACKGROUND

The following relates generally to wireless communication, and more specifically to uplink control information transmission (UCI) in autonomous uplink.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless systems may enable communication between a base station and a UE over shared or unlicensed radio frequency spectrum bands, or over different radio frequency spectrum bands (e.g., licensed radio frequency spectrum bands and unlicensed radio frequency spectrum bands). When using a shared or unlicensed radio frequency spectrum band, transmitters (e.g., UEs, base stations, or other network access devices) may perform contention-based channel access (e.g., by performing a listen before talk (LBT) procedure) according to contention-based rules that provide for fair channel access to transmitters that wish to use the shared radio frequency spectrum band.

In some cases, a base station may schedule a UE for uplink communications through an assignment or grant of resources. The base station may configure the UE to autonomously transmit uplink communications according to an autonomous uplink configuration. In such cases, the base station may not be aware of particular timings for uplink transmissions, due to the autonomous nature of such transmissions and due to the contention-based access to the shared radio frequency spectrum band. Conventional autonomous uplink transmission schemes are deficient.

SUMMARY

The described techniques relate to improved methods, systems, devices, or apparatuses that support uplink control information (UCI) transmission in autonomous uplink. Generally, the described techniques provide for efficient coordination of autonomous uplink transmissions between a user equipment (UE) and a base station (e.g., eNodeB (eNB), next generation eNB (gNB)) in a wireless communication system. The base station may configure one or more transmission parameters, for an autonomous uplink transmission, including a modulation coding scheme (MCS), a rank indicator (RI), a precoding matrix indicator (PMI), resource allocation (e.g., time and frequency resources), a waveform, activation or deactivation of downlink control information (DCI), or the like. After receiving the transmission parameters, the UE may autonomously adjust one or more of the transmission parameters based on, for example, current link quality, traffic load, or the like.

The UE may signal the adjustment in uplink control information (UCI) within anchor resources of a resource allocation specified by the base station, and the UE may generate an autonomous uplink transmission in accordance with the signaled one or more transmission parameters. The base station (e.g., gNB) may monitor the anchor resources of the resource allocation to obtain the UCI to enable the base station to decode the autonomous uplink transmission transmitted within the resource allocation. This efficient coordination may improve channel utilization in an unlicensed spectrum for the UE, by permitting a UE to adjust the one or more transmission parameters in accordance with current link quality, traffic demands, or the like.

A method for wireless communication by a UE is described. The method may include receiving, from a base station, a resource allocation indicator corresponding to a total number of resource elements to allocate for uplink control information within a resource allocation of a shared data channel; determining anchor resources within the resource allocation; determining a plurality of transmission parameters for an autonomous uplink transmission based at least in part on the total number of resource elements; and transmitting, to the base station, the uplink control information within the anchor resources to indicate the plurality of transmission parameters for the autonomous uplink transmission.

An apparatus for wireless communication is described. The apparatus may include means for receiving, from a base station, a resource allocation indicator corresponding to a total number of resource elements to allocate for uplink control information within a resource allocation of a shared data channel; means for determining anchor resources within the resource allocation; means for determining a plurality of transmission parameters for an autonomous uplink transmission based at least in part on the total number of resource elements; and means for transmitting, to the base station, the uplink control information within the anchor resources to indicate the plurality of transmission parameters for the autonomous uplink transmission.

Another apparatus for wireless communication is described. The apparatus may include a processor, memory in electronic communication with the processor, and instructions stored in the memory. The instructions may be operable to cause the processor to receive, from a base station, a resource allocation indicator corresponding to a total number of resource elements to allocate for uplink control information within a resource allocation of a shared data channel; determine anchor resources within the resource allocation; determine a plurality of transmission parameters for an autonomous uplink transmission based at least in part on the total number of resource elements; and transmit, to the base station, the uplink control information within the anchor resources to indicate the plurality of transmission parameters for the autonomous uplink transmission.

A non-transitory computer-readable medium for wireless communication is described. The non-transitory computer-readable medium may include instructions operable to cause a processor to receive, from a base station, a resource allocation indicator corresponding to a total number of resource elements to allocate for uplink control information within a resource allocation of a shared data channel; determine anchor resources within the resource allocation; determine a plurality of transmission parameters for an autonomous uplink transmission based at least in part on the total number of resource elements; and transmit, to the base station, the uplink control information within the anchor resources to indicate the plurality of transmission parameters for the autonomous uplink transmission.

Some examples of the method, apparatus, and non-transitory computer-readable medium described above may further include processes, features, means, or instructions for generating the autonomous uplink transmission in accordance with the plurality of transmission parameters; and transmitting the autonomous uplink transmission within the resource allocation.

Some examples of the method, apparatus, and non-transitory computer-readable medium described above may further include processes, features, means, or instructions for processing the resource allocation indicator to determine one or more nominal parameters; and calculating the total number of resource elements based at least in part on the one or more nominal parameters.

In some examples of the method, apparatus, and non-transitory computer-readable medium described above, the resource allocation indicator specifies the total number of resource elements.

In some examples of the method, apparatus, and non-transitory computer-readable medium described above, the resource allocation indicator specifies an aggregation level of a plurality of different aggregation levels for transmitting the uplink control information to indicate the total number of resource elements.

Some examples of the method, apparatus, and non-transitory computer-readable medium described above may further include processes, features, means, or instructions for receiving configuration information indicating the anchor resources within the resource allocation.

In some examples of the method, apparatus, and non-transitory computer-readable medium described above, the resource allocation corresponds to a plurality of symbol periods within a plurality of resource blocks, and wherein the anchor resources correspond to a subset of the plurality of resource blocks and a subset of the plurality of symbol periods.

In some examples of the method, apparatus, and non-transitory computer-readable medium described above, the plurality of transmission parameters indicate a modulation and coding scheme (MCS), or a modulation type, or a rank indicator (RI), or at least a portion of the resource allocation being utilized, or a precoding matrix indicator (PMI), or a waveform type, or any combination thereof, for the autonomous uplink transmission.

Some examples of the method, apparatus, and non-transitory computer-readable medium described above may further include processes, features, means, or instructions for adjusting one or more transmission parameters of the plurality of transmission parameters; and transmitting the autonomous uplink transmission in accordance with the adjusted one or more transmission parameters.

Some examples of the method, apparatus, and non-transitory computer-readable medium described above for adjusting the one or more transmission parameters may further include processes, features, means, or instructions for adjusting the one or more transmission parameters based at least in part on a link quality measurement, or an amount of uplink data available to send in the autonomous uplink transmission, or power headroom, or any combination thereof.

In some examples of the method, apparatus, and non-transitory computer-readable medium described above, at least one of the plurality of transmission parameters indicates that the autonomous uplink transmission is transmitted using a portion of the resource allocation.

Some examples of the method, apparatus, and non-transitory computer-readable medium described above may further include processes, features, means, or instructions for modulating the uplink control information with quadrature phase shift keying (QPSK) modulation.

In some examples of the method, apparatus, and non-transitory computer-readable medium described above, the uplink control information is QPSK modulated using a first sub-constellation of a data modulation constellation, and that uplink data of the autonomous uplink transmission is modulated using a modulation order indicated in the uplink control information.

Some examples of the method, apparatus, and non-transitory computer-readable medium described above for transmitting the uplink control information may further include processes, features, means, or instructions for transmitting the uplink control information in accordance with a defined rank.

Some examples of the method, apparatus, and non-transitory computer-readable medium described above may further include processes, features, means, or instructions for rate matching uplink data of the autonomous uplink transmission around resource elements of the resource allocation allocated for transmitting the uplink control information.

Some examples of the method, apparatus, and non-transitory computer-readable medium described above for transmitting the uplink control information may further include processes, features, means, or instructions for transmitting a demodulation reference signal embedded within the uplink control information.

Some examples of the method, apparatus, and non-transitory computer-readable medium described above may further include processes, features, means, or instructions for transmitting, via a same port used for transmitting the uplink control information, a demodulation reference signal and the autonomous uplink transmission that is generated in accordance with the plurality of transmission parameters.

Some examples of the method, apparatus, and non-transitory computer-readable medium described above may further include processes, features, means, or instructions for transmitting, using a first rank that is higher than the defined rank used for transmitting the uplink control information, the autonomous uplink transmission that is generated in accordance with the plurality of transmission parameters.

Some examples of the method, apparatus, and non-transitory computer-readable medium described above for transmitting the uplink control information may further include processes, features, means, or instructions for transmitting the uplink control information in a first layer corresponding to the defined rank; and transmitting uplink data in a plurality of layers that includes the first layer. In some examples of the method, apparatus, and non-transitory computer-readable medium described above, the uplink data is rate matched around resource elements associated with the uplink control information in the first layer. In some examples of the method, apparatus, and non-transitory computer-readable medium described above, a total number of the plurality of layers corresponds to a first rank that is higher than the defined rank.

Some examples of the method, apparatus, and non-transitory computer-readable medium described above may further include processes, features, means, or instructions for transmitting, via a plurality of ports used for transmitting the uplink control information, a demodulation reference signal and the autonomous uplink transmission that is generated in accordance with the plurality of transmission parameters.

Some examples of the method, apparatus, and non-transitory computer-readable medium described above may further include processes, features, means, or instructions for selecting a rank for the autonomous uplink transmission; and transmitting the autonomous uplink transmission that is generated in accordance with the selected rank and the plurality of transmission parameters. In some examples of the method, apparatus, and non-transitory computer-readable medium described above, the uplink control information is transmitted in accordance with the selected rank and at least one of the plurality of transmission parameters indicates the selected rank.

Some examples of the method, apparatus, and non-transitory computer-readable medium described above may further include processes, features, means, or instructions for modulating the uplink control information using a same modulation order in each layer of a plurality of layers, wherein a total number of the plurality of layers corresponds to the selected rank.

Some examples of the method, apparatus, and non-transitory computer-readable medium described above may further include processes, features, means, or instructions for applying a different scrambling sequence of a plurality of scrambling sequences to the uplink control information transmitted in each layer of a plurality of layers. In some examples of the method, apparatus, and non-transitory computer-readable medium described above, a total number of the plurality of layers corresponds to the selected rank.

Some examples of the method, apparatus, and non-transitory computer-readable medium described above may further include processes, features, means, or instructions for generating a plurality of redundancy versions for the uplink control information. Some examples of the method, apparatus, and non-transitory computer-readable medium described above for transmitting the uplink control information may further include processes, features, means, or instructions for transmitting a different redundancy version of the plurality of redundancy versions on a respective layer of a plurality of layers. In some examples of the method, apparatus, and non-transitory computer-readable medium described above, a total number of the plurality of layers corresponds to the selected rank.

Some examples of the method, apparatus, and non-transitory computer-readable medium described above may further include processes, features, means, or instructions for transmitting a demodulation reference signal via a plurality of ports used for transmitting the autonomous uplink transmission and the uplink control information.

Some examples of the method, apparatus, and non-transitory computer-readable medium described above may further include processes, features, means, or instructions for transmitting, in accordance with the plurality of transmission parameters, the autonomous uplink transmission as an orthogonal frequency division multiplexing (OFDM) waveform or a single carrier frequency division multiplexing (SC-FDM) waveform.

A method for wireless communication by a base station. The method may include transmitting, to a UE, a resource allocation indicator corresponding to a total number of resource elements to allocate for uplink control information within a resource allocation of a shared data channel; configuring the UE with anchor resources within the resource allocation for transmission of uplink control information; monitoring the anchor resources of the resource allocation for the uplink control information that indicates a plurality of transmission parameters corresponding to the total number of the resource elements; and monitoring the resource allocation for an autonomous uplink transmission generated in accordance with the plurality of transmission parameters.

In some examples of the method, apparatus, and non-transitory computer-readable medium described above, the resource allocation indicator specifies the total number of resource elements.

In some examples of the method, apparatus, and non-transitory computer-readable medium described above, the resource allocation indicator comprises one or more nominal parameters.

In some examples of the method, apparatus, and non-transitory computer-readable medium described above, the resource allocation indicator specifies an aggregation level of a plurality of different aggregation levels for transmitting the uplink control information.

Some examples of the method, apparatus, and non-transitory computer-readable medium described above for monitoring the resource allocation for the autonomous uplink transmission may further include processes, features, means, or instructions for extracting tones from the anchor resources to obtain the uplink control information.

Some examples of the method, apparatus, and non-transitory computer-readable medium described above for monitoring for the autonomous uplink transmission may further include processes, features, means, or instructions for blinding decoding the anchor resources in accordance with a plurality of decoding hypotheses to obtain the uplink control information.

In some examples of the method, apparatus, and non-transitory computer-readable medium described above, the uplink control information is modulated using QPSK modulation.

In some examples of the method, apparatus, and non-transitory computer-readable medium described above, the uplink control information is QPSK modulated using a first sub-constellation of a data modulation constellation, and that uplink data of the autonomous uplink transmission is modulated using a modulation order indicated in the uplink control information.

Some examples of the method, apparatus, and non-transitory computer-readable medium described above for monitoring the resource allocation for the uplink control information may further include processes, features, means, or instructions for decoding the resource allocation in accordance with a first rank to obtain the uplink control information from a first layer.

Some examples of the method, apparatus, and non-transitory computer-readable medium described above may further include processes, features, means, or instructions for decoding the resource allocation in accordance with a second rank that is higher than the first rank to obtain uplink data of the autonomous uplink transmission from a plurality of layers that includes the first layer.

Some examples of the method, apparatus, and non-transitory computer-readable medium described above may further include processes, features, means, or instructions for processing at least one of the plurality of transmission parameters to determine a rank for the autonomous uplink transmission; and decoding the resource allocation in accordance with the rank to obtain the uplink control information and uplink data of the autonomous uplink transmission.

Some examples of the method, apparatus, and non-transitory computer-readable medium described above for monitoring the resource allocation for the uplink control information may further include processes, features, means, or instructions for applying a same modulation order to each layer of a plurality of layers of the resource allocation to de-modulate the resource allocation for obtaining the uplink control information, wherein a total number of the plurality of layers corresponds to the rank.

Some examples of the method, apparatus, and non-transitory computer-readable medium described above may further include processes, features, means, or instructions for applying a different scrambling sequence of a plurality of scrambling sequences to respectively descramble bits decoded from each layer of a plurality of layers of the resource allocation to obtain the uplink control information, wherein a total number of the plurality of layers corresponds to the rank.

Some examples of the method, apparatus, and non-transitory computer-readable medium described above may further include processes, features, means, or instructions for decoding each layer of a plurality of layers of the resource allocation to obtain a different redundancy version of a plurality of redundancy versions for the uplink control information, wherein a total number of the plurality of layers corresponds to the rank.

Some examples of the method, apparatus, and non-transitory computer-readable medium described above for monitoring the resource allocation for the autonomous uplink transmission may further include processes, features, means, or instructions for receiving the autonomous uplink transmission as an OFDM waveform or a SC-FDM waveform.

DETAILED DESCRIPTION

Figure 1:
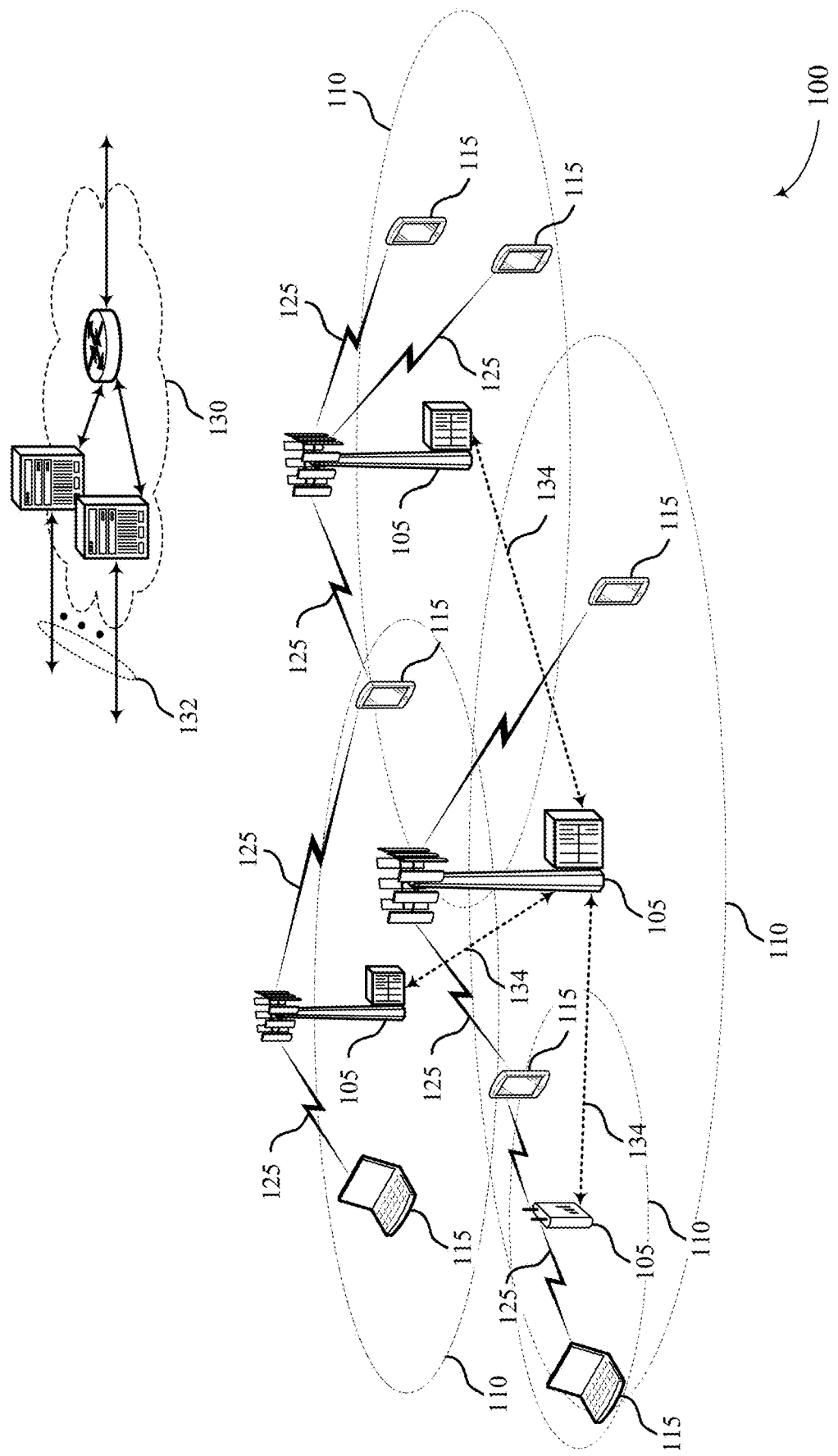
FIGS. 1 and 2 illustrates an example of a wireless communication system that supports uplink control information (UCI) transmission in autonomous uplink in accordance with aspects of the present disclosure.

The described techniques relate to improved methods, systems, devices, or apparatuses that support uplink control information transmission (UCI) in autonomous uplink. Generally, the described techniques provide for efficient coordination of autonomous uplink transmissions between a user equipment (UE) and a base station (e.g., eNodeB (eNB), next generation eNB (gNB)) in a wireless communication system. The base station may configure one or more transmission parameters, for autonomous uplink transmission, including a modulation coding scheme (MCS), a rank indicator (RI), a precoding matrix indicator (PMI), resource allocation (e.g., time and frequency resources), a waveform, activation or deactivation of downlink control information (DCI), or the like. After receiving the transmission parameters, the UE may autonomously adjust one or more of the transmission parameters, and may signal to the base station (e.g., gNB) the adjustment in uplink control information (UCI).

In an example, a base station may configure the UE to autonomously transmit uplink communications according to an autonomous uplink configuration. In such cases, the base station may not be aware of particular timings for uplink transmissions, due to the autonomous nature of such transmissions and due to the contention-based access to the shared radio frequency spectrum band. In some cases, the base station may configure one or more transmission parameters for the autonomous uplink transmission, including a modulation and coding scheme (MCS), a rank indicator (RI), a pre-coding matrix indicator (PMI), resource allocation (e.g., time and frequency resources), etc. The transmission parameters, as well as a resource allocation, may be provided by the base station to the UE.

The UE may perform autonomous uplink transmissions according to the provided transmission parameters. However, in some cases, it may be beneficial for the UE to adjust one or more of the parameters to improve efficiency and throughput in a wireless communication system. To realize a dynamic autonomous uplink configuration, after receiving the transmission parameters, the UE may autonomously adjust one or more of the transmission parameters. The UE may signal the adjustment in uplink control information (UCI) within anchor resources of a resource allocation specified by the base station to avoid the base station having to perform blind detection. The UE may generate an autonomous uplink transmission in accordance with the signaled one or more transmission parameters.

The base station (e.g., gNB) may monitor the anchor resources of the resource allocation to obtain the UCI to enable the base station to decode the autonomous uplink transmission transmitted within the resource allocation. This efficient coordination may improve channel utilization in an unlicensed spectrum for the UE, by permitting a UE to adjust the one or more transmission parameters in accordance with current link quality, traffic demands, or the like.

Aspects of the disclosure are initially described in the context of a wireless communications system. Aspects of the disclosure are further illustrated by and described with reference to configurations and process flows that relate to UCI in autonomous uplink. Aspects of the disclosure are further illustrated by and described with reference to apparatus diagrams, system diagrams, and flowcharts that relate to UCI in autonomous uplink.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, or communications with low-cost and low-complexity devices.

In some cases, aspects of the wireless communications system 100 may be configured as a MuLTEFire network. A MuLTEFire network may include base stations 105 communicating with UEs 115 in unlicensed radio frequency spectrum band, e.g., without a licensed radio frequency anchor carrier. For example, the MuLTEFire network may operate without an anchor carrier in licensed radio frequency spectrum. In some examples of wireless communication systems, such as MuLTEFire, further enhanced License Assisted Access (FeLAA), and NR, a UE 115 may be configured for autonomous uplink transmission. A base station 105 may schedule a UE 115 for uplink communications through an assignment or grant of resources. In some cases, the base station 105 may configure the UE 115 to autonomously transmit uplink communications according to an autonomous uplink configuration. In such cases, the base station 105 may not be aware of particular timings for uplink transmissions, due to the autonomous nature of such transmissions and due to the contention-based access to the shared radio frequency spectrum band.

The base station 105 may configure one or more transmission parameters, for autonomous uplink transmission, including a MCS, a RI, a PMI, resource allocation (e.g., time and frequency resources), a waveform, activation or deactivation of DCI, or the like. In some cases, adaptive transmission may yield higher system throughput. Permitting the UE 115 to perform dynamic link adaptation permits the UE 115 to adjust the one or more transmissions parameters to reflect current link quality as compared to semi-statically setting MCS/RI/PMI by the base station 105. For example, the UE 115 may be able to use higher MCS/rank with better link quality or lower MCS/rank when link quality degrades. The UE 115 may use the dynamic resource allocation to adapt the traffic parameter(s) in accordance with the traffic load, power headroom, or the like, currently experienced by the UE 115. In some cases, if the UE 115 has a smaller payload or lower power headroom, the UE 115 may use a smaller resource allocation (e.g., either in time or frequency resources) for an autonomous uplink transmission.

To realize a dynamic autonomous uplink configuration, after receiving the transmission parameters, the UE 115 may autonomously adjust one or more of the transmission parameters within the set of transmission parameters configured by the base station. The UE 115 may signal to the base station 105 (e.g., gNB) the adjustment so to avoid the base station 105 from having to perform blind detection of an autonomous uplink transmission. The UE 115 may provide the indication of the adjusted one or more transmission parameters in UCI. In some wireless communication systems such as in MuLTEFire and/or FeLAA, uplink UCI has been introduced for UEs 115 to signal HARQ, redundancy version, and a new data indicator (NDI).

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. The wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in the wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and the wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

A base station 105 may configure the UE 115 to autonomously transmit uplink communications according to an autonomous uplink configuration. In some examples, the base station 105 may not be aware of particular timings for uplink transmissions, due to the autonomous nature of such transmissions. In some cases, after receiving the transmission parameters, the UE 115 may autonomously adjust one or more of the transmission parameters, to realize a dynamic autonomous uplink configuration.

The UE 115 may transmit UCI to indicate the one or more transmission parameters to the base station 105. In an example, the UE 115 transmits UCI within a control channel (e.g., a physical uplink control channel (PUCCH)). In some cases, the UE 115 may transmit UCI in a shared data channel (e.g., a physical uplink shared channel (PUSCH)).

A base station 105 may transmit, to a UE 115, a resource allocation indicator corresponding to a total number of resource elements to allocate for UCI within a resource allocation of a shared data channel. In some cases, the UE 115 may receive, from the base station 105, the resource allocation indicator corresponding to the total number of resource elements to allocate for UCI within the resource allocation of the shared data channel. In some cases, the UE 115 may calculate the total number of resource elements to allocate for UCI within the resource allocation of the shared data channel based on the resource allocation indicator.

In some cases, the base station 105 may configure the UE 115 with anchor resources within a resource allocation for transmission of UCI. In some cases, the UE 115 may also determine anchor resources within the resource allocation and configured by the base station 105. The base station 105 may monitor the anchor resources to obtain and decode the UCI. The base station 105 may process the UCI to determine the one or more transmission parameters used by the UE 115 to generate an autonomous uplink transmission within the resource allocation, and the base station 105 may use the one or more transmission parameters to decode the autonomous uplink transmission from the resource allocation. In some examples, the UE 115 may determine a plurality of transmission parameters for an autonomous uplink transmission based on the total number of resource elements, and transmit, to the base station 105, the UCI within the anchor resources to indicate the plurality of transmission parameters for the autonomous uplink transmission.

The base station 105 may monitor the anchor resources of the resource allocation for the UCI that indicates a plurality of transmission parameters corresponding to the total number of the resource elements, and monitor for the resource allocation for an autonomous uplink transmission generated in accordance with the plurality of transmission parameters.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

The wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. The wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

The wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, the wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, the wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, the wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-S-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation order (e.g., QPSK, 16-QAM, 64-QAM, etc.). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

The wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, the wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
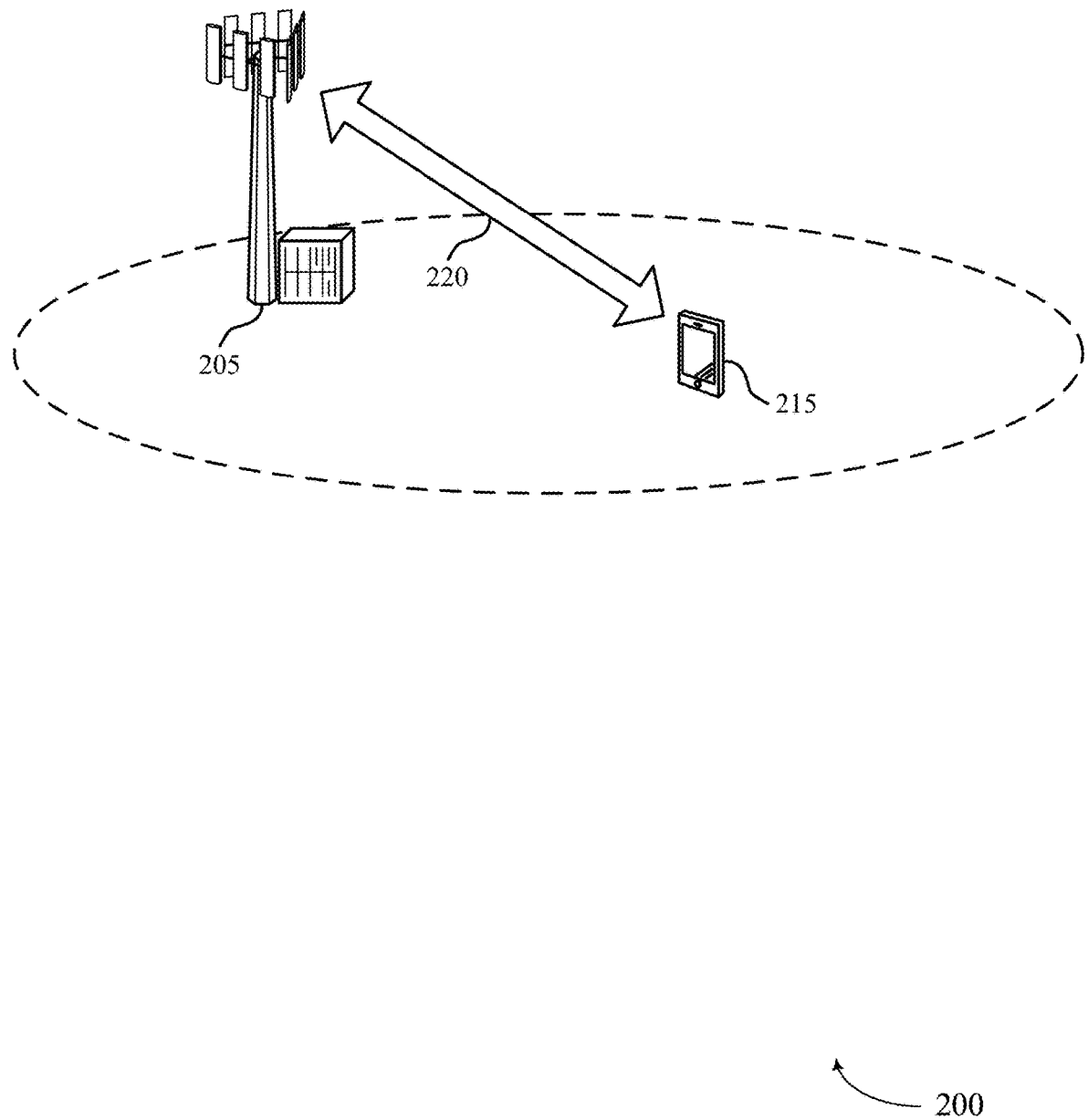

FIG. 2 illustrates an example of a wireless communication system 200 that supports UCI in autonomous uplink in accordance with various aspects of the present disclosure. In some examples, the wireless communication system 200 may implement aspects of the wireless communication system 100. The wireless communications system 200 may include a base station 205 and a UE 215, which may be examples of the corresponding devices described with reference to FIG. 1. The wireless communications system 200 may also operate according to a radio access technology (RAT) such as a 5G NR RAT, although techniques described herein may be applied to any RAT and to systems that may concurrently use two or more different RATs that support beamformed transmissions. In some cases, the wireless communication system 200 may support autonomous modification of one or more transmission parameters used to generate an autonomous uplink transmission, to enhance communication efficiency and reduce latency in the wireless communications system 200.

The base station 205 may perform a RRC procedure (e.g., cell acquisition procedure, random access procedure, RRC connection procedure, RRC configuration procedure) with the UE 215. The base station 205 may be configured with multiple antennas, which may be used for directional or beamformed transmissions. In some examples, the RRC procedure may include a beam sweep procedure. As part of the RRC procedure, the base station 205 and the UE 215 may establish a bi-directional communication link 220 for communication. In some cases, the UE 215 may be time-synchronized with the base station 205, and may be capable of unscheduled or autonomous uplink transmissions. The UE 215 may perform a contention procedure to gain channel access, and may transmit uplink transmissions, which may contain autonomous uplink transmissions, via the bi-directional communication link 220.

The base station 205 may also configure the UE 215 for autonomous uplink transmissions through downlink transmissions (e.g., RRC signaling) that may include transmission parameters. For example, the base station 205 may configure one or more transmission parameters including a MCS, a RI, a PMI, resource allocation (e.g., time and frequency resources), a waveform, activation or deactivation of DCI, or the like. The base station 205 may also configure the UE 215 with a resource allocation, which may correspond to a period of time during which the UE 215 may contend for access to a shared data channel (e.g., a PUSCH) for sending autonomous uplink transmissions.

In some cases, the base station 205 may not be aware of particular timings for uplink transmissions, due to the autonomous nature. To realize a dynamic autonomous uplink configuration, after receiving the transmission parameters, the UE 215 may autonomously change one or more of the transmission parameters and signal the change to the base station 205. For example, the UE 215 may provide the indication of the change in UCI.

In some wireless communication systems, UCI transmission may depend on the MCS, the rank, and the resource allocation of an uplink shared data channel (e.g., PUSCH). In some examples, UCI may be mapped to all layers of a transport block on the uplink channel.

In an example, the base station 205 may provide one or more transmission parameters (e.g., MCS, rank, resource allocation, etc.) to the UE 215. As a result, the UE 215 may use the one or more transmission parameters for UCI transmission. In some examples, the UE 215 may autonomously change one or more of the transmission parameters (e.g., change one or more of the MCS, rank, resource allocation, or the like, or any combination thereof). For the base station 205 to detect and decode an autonomous uplink transmission generated in accordance with one or more modified transmission parameters, the UE 215 may provide UCI to the base station 205 to signal the MCS, rank, resource allocation, or the like, being used to generate the autonomous uplink transmission.

In order for the base station 205 to detect UCI, the amount of resource elements used for UCI transmission as well as resource element mapping for UCI may need to be known by each of the base station 205 and the UE 215. Since the UE 215 may autonomously change one or more of the transmission parameters, the base station 205 may inform the UE 215 of a nominal parameters set in a resource allocation indicator for calculating the number of resource elements for the UCI transmission (e.g., via DCI or RRC signaling). The nominal parameters set specified in the resource allocation indicator may be one or more defined values for the transmission parameters to be used for calculating the number of resource elements to allocate for the UCI transmission. Thus, UCI resource element calculation may use the nominal parameters set, without relying on the actual transmission parameters (e.g., MCS and resource allocation) used for an autonomous uplink transmission (e.g., a PUSCH transmission).

In some examples, the base station 205 or the UE 215 may calculate a number of resource elements, denoted as Q', to reserve for UCI transmission in a shared data channel transmission (e.g., a PUSCH transmission) according to the following equation:

$$Q' = \min\left(\left\lceil \frac{(O+L) \cdot M_{SC}^{PUSCH} \cdot N_{symb}^{PUSCH} \cdot \beta_{offset}}{\sum_{r=0}^{C-1} K_r} \right\rceil, M_{SC}^{PUSCH} \cdot N_{symb}^{PUSCH}\right) \quad (1)$$

In the above equation, O is the number of bits for a UCI payload. L is the number of bits of a CRC generated from the UCI payload. $M_{SC}^{PUSCH}$ is the scheduled bandwidth of an autonomous uplink transmission (e.g., a PUSCH transmission), expressed as a number of subcarriers. $N_{symb}^{PUSCH}$ is the number of OFDM symbols of the autonomous uplink transmission (e.g., a PUSCH transmission), excluding all OFDM symbols used for a demodulation reference signal (DMRS). Q' is the number of resource elements (e.g., the number of coded modulation symbols per layer) for the UCI transmitted on the PUSCH. $K_r$ is the r-th code block size for the autonomous uplink transmission (e.g., a PUSCH transmission). $\beta_{offset}$ may have a value that is set based on downlink signalling (e.g., DCI or RRC signalling) received by the UE 215 from the base station 205. In some cases, $\beta_{offset}$ may be a weighting value for controlling the proportion of a total number of available resource elements that are allocated for UCI transmission. A lower $\beta_{offset}$ may be used to allocate fewer resource elements for UCI transmission and more resource elements for transmission of uplink data within an autonomous uplink transmission. A higher $\beta_{offset}$ may be used to allocate more resource elements for UCI transmission and fewer resource elements for transmission of uplink data within an autonomous uplink.

In an example, the base station 205 may signal the $\beta_{offset}$ for the UE 215 to determine the number of resource elements to use for UCI transmission. In some cases, sets of $\beta_{offset}$ values that can be configured by RRC signaling. The base station 205 may use activation or deactivation of DCI to indicate an index to the sets of $\beta_{offset}$ values to indicate which set is to be used to calculate the number of resource elements to allocate for the UCI transmission. In some cases, the $\beta_{offset}$ may be different from a $\beta_{offset}$ used for UCI in downlink transmission (e.g., such as ACK/NACK, channel state information (CSI), etc.).

The base station 205 may configure the UE 215 with resource element mappings based on the number of resource elements to use for UCI transmission. Thus, the UE 215 may map the UCI data to resource elements within a resource allocation in accordance with the mapping, and the base station 205 may monitor for resource elements that include UCI data in accordance with the mapping.

In some examples, instead of or in addition to calculating the number of resource elements to allocate to UCI using equation (1), the base station 205 and the UE 215 may provide explicit signaling in a resource allocation indicator of the amount of resource elements to allocate for UCI. That is, instead of indicating the nominal parameters set, the base station 205 may signal to the UE 215 the number of resource elements to use for UCI. For example, the base station 205 may include a bit sequence in RRC signaling or DCI to indicate the number of resource elements to allocate for UCI.

In another example, signaling of a particular aggregation level in a resource allocation indicator may be used to indicate the number of resource elements to allocate for UCI. For example, the base station 205 may signal an aggregation level of a set of different aggregation levels. The respective aggregation levels may map to different number of resource elements for the UCI transmission. For example, the base station 205 may configure the UE 215 with a table. The table may associate a set of aggregation levels with a set of numbers of resource elements for the UCI transmission. The base station 205 may signal a particular one of the aggregation levels, and the UE 215 may determine which number of resource elements to use for the UCI transmission that corresponds to the signaled aggregation level.

The UE 215 may use a total number of resource elements in its resource allocation (e.g. $M_{SC}^{PUSCH} \cdot N_{symb}^{PUSCH}$) in the shared data channel and the number of resource elements of the resource allocation to use for the UCI transmission, to determine one or more transmission parameters for an autonomous uplink transmission in the number of remaining resource elements (e.g., total number resource elements less the number of resource elements to use for the UCI transmission).

Figure 3:
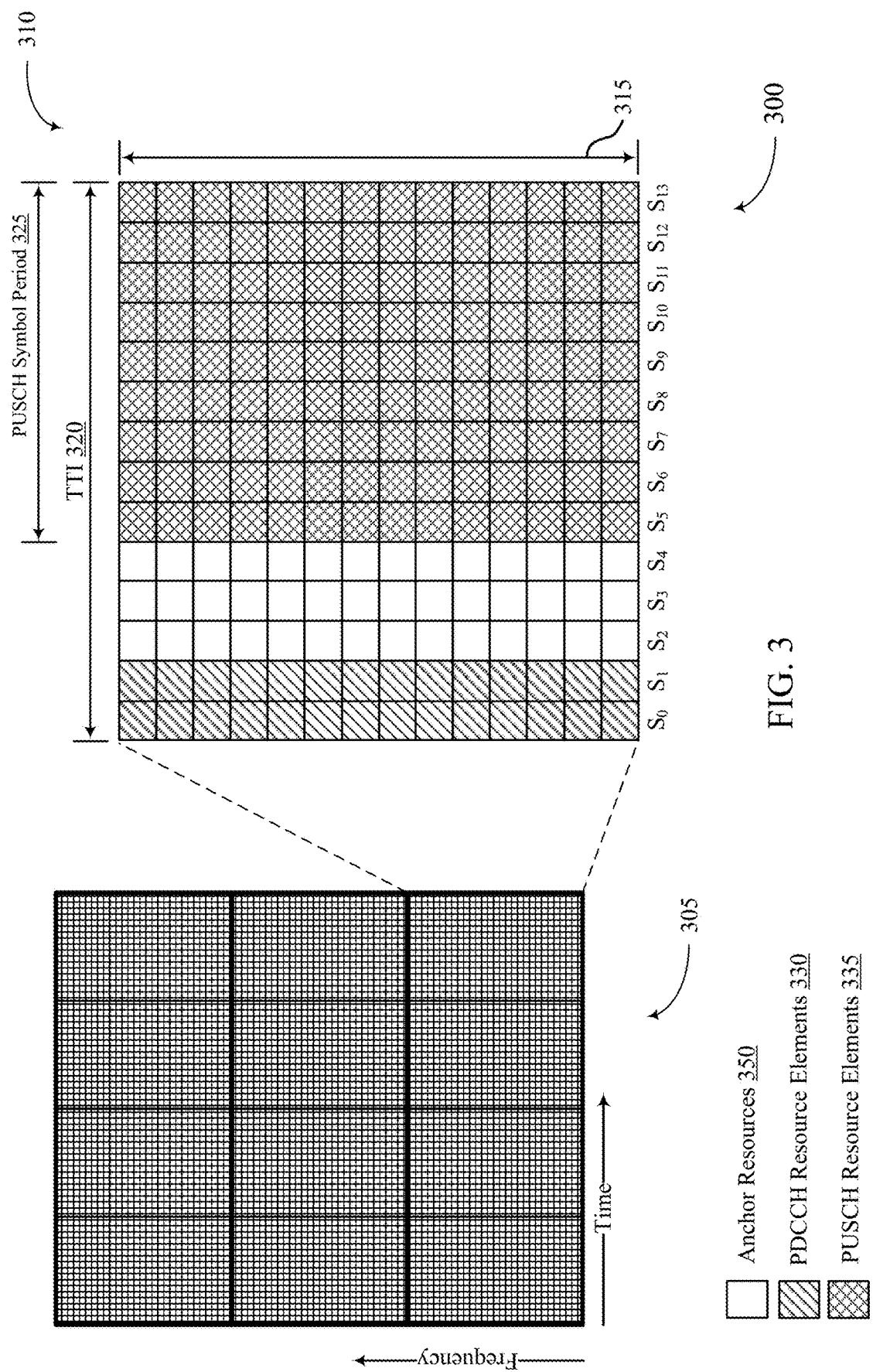
FIG. 3 illustrates an example of a configuration that supports UCI in autonomous uplink in accordance with aspects of the present disclosure.

FIG. 3 illustrates an example of a configuration 300 that supports UCI in autonomous uplink in accordance with various aspects of the present disclosure. In some examples, the configuration 300 may implement aspects of the wireless communication system 100 and 200. In some examples, the configuration 300 may support resource element mapping for UCI. With reference to FIG. 2, since the UE 215 may change a resource allocation (e.g., either in time or frequency domain, or using a different starting point), the UCI resource element mapping may be independent of resource allocation or a particular starting point within the resource allocation.

The configuration 300 may illustrate a resource grid 305. The resource grid 305 may correspond to a system bandwidth that the base station 205 may allocate to one or more UEs 215, and the resource grid 305 may continue indefinitely in time. Information may be organized as a function of frequency as well as time using the resource grid 305. A resource element, may span one symbol by one sub-carrier. Each resource element may carry two, four or six physical channel bits, depending on the MCS (e.g., QPSK, 16-quadrature amplitude modulation (QAM), 64-QAM, or the like). Resource elements may be grouped into resource blocks (RBs), each of which may span 180 kHz (e.g., 12 sub-carriers). The base station 205 may allocate RBs to one or more UEs 215, by allocating the symbols and sub-carriers within each TTI 320 in units of RBs to respective UEs 215. The configuration 300 also illustrates an expandable view of a RB 310 associated with the resource grid 305. The RB 310 may be associated with a TTI 320 that may span 14 symbol periods and a number of subcarriers within a bandwidth 365.

In some cases, a first and second symbol period of the TTI 320 (e.g., leftmost columns) may include a number of PDCCH resource elements 330 for a PDCCH transmission. The PDCCH resource elements 330 may transporting downlink signaling, such as DCI, from the base station 205 to the UE 215, and PUSCH resource elements 335 may transport a PUSCH transmission during a PUSCH symbol period 325, from the UE 215 to the base station 205. In some examples, base station 205 may transmit, to the UE 215 on the PDCCH resource elements 330, a resource allocation indicator corresponding to a total number of resource elements to allocate for UCI within a resource allocation of a shared data channel (e.g., during PUSCH symbol period 325). In other examples, the base station 205 may transmit the resource allocation indicator via RRC signaling.

In some cases, the base station 205 may configure the UE 215 (e.g., via RRC signaling, in DCI, etc.) with anchor resources 350 within a resource allocation for transmission of UCI. For example, the base station 205 may configure the UE 215 with a resource allocation and signal configuration information (e.g., an anchor resource assignment) that identifies anchor resources 350 within the resource allocation in which the UE 215 may transmit an autonomous uplink transmission. The anchor resources 350 may include one or more anchor symbols in one or more anchor RBs within the resource allocation, and at least one starting port of the one or more anchor symbols. For example, the base station 205 may configure the UE 215 with a resource allocation of 20 RBs, where the resource allocation spans 10 or 12 symbols, and has two starting points (e.g., $S_0$ and $S_2$).

In an example, the anchor RBs may be a subset of RBs within the resource allocation (e.g., 5 of the 20 RBs), and the anchor symbols may be symbols $S_2$, $S_3$, and/or $S_4$ within each of the anchor RBs. In the example of FIG. 3, RB 310 is an anchor RB, and the anchor resources 350 correspond to resource elements of symbols $S_2$, $S_3$, and/or $S_4$. In this example, the UE 215 may transmit UCI in the five anchor RBs and on symbols $S_2$, $S_3$, and/or $S_4$. The base station 205 may also know the location of the anchor resources within the resource allocation, and hence may be able to identify and decode the UCI from the anchor resources 350.

For autonomous uplink transmission on a shared data channel (e.g., PUSCH), the UE 215 may be allowed to use a subset of its resource allocation. For example, the resource allocation may specify a minimum amount of resources to use for an autonomous uplink transmission (e.g., at least five RBs, and the number of symbols allowed may be four, seven, or 10 symbols in the time domain in each of the five RBs). If the UE 215 uses an OFDM waveform for transmission on the shared data channel, the base station 205 may extract the UCI tones from the anchor resources (e.g., anchor RBs and anchor symbols).

If the UE 215 uses a single carrier frequency division multiplexing (SC-FDM) waveform on the shared data channel, the base station 205 may perform blind detection on the permitted combinations of RBs within the resource allocation. In an example, the base station 205 may configure the UE 215 with a resource allocation of 20 RBs, and the resource allocation may specify that the anchor resources 350 correspond to increments of 5 RBs (e.g., 5, 10, 15, or 20 RBs). The base station 205 may not know which RB increment the UE 215 used for transmitting UCI, and may perform blind detection on each RB increment to determine which RB increment the UE 215 used for transmitting UCI. For example, the base station 205 may apply a set of blind decoding hypotheses to the resource elements of the resource allocation, one for each of the different RB increments. The UE 215 may generate a CRC on a UCI payload and transmit the UCI payload and the CRC corresponding to a particular RB increment. The base station 205 may perform a CRC check on each RB increment according to each of the decoding hypotheses to determine which RB increment passes CRC verification. The base station 205 may use the UCI payload corresponding to the RB increment that passed CRC verification.

With reference to FIG. 2, the UE 215 may receive, from the base station 205, a resource allocation indicator corresponding to the total number of resource elements to allocate for UCI within a resource allocation of the shared data channel. The resource allocation indicator may specify the total number of resource elements for UCI. In some cases, the UE 215 may receive configuration information indicating the anchor resources 350 within the resource allocation. For example, the UE 215 may determine anchor resources (e.g., $S_2$, $S_3$, and/or $S_4$) within the resource allocation based on the received configuration information. In some cases, the resource allocation may correspond to a number of symbol periods within a plurality of resource blocks of the resource grid 305. The anchor resources 350 as such may correspond to a subset of the plurality of symbol periods in a subset of the plurality of RBs.

The UE 215 may determine plurality of transmission parameters for an autonomous uplink transmission based on the total number of resource elements. The plurality of transmission parameters may indicate a MCS, or a modulation type, or a RI, or at least a portion of the resource allocation being utilized, or a PMI, or a waveform type, or any combination thereof, for the autonomous uplink transmission. In some examples, at least one of the plurality of transmission parameters may indicate that the autonomous uplink transmission is transmitted using a subset of the resource allocation (e.g., only 5 of the 20 allocated RBs). In some cases, the UE 215 may process the resource allocation indicator to determine one or more nominal parameters, and calculate the total number of resource elements based on the one or more nominal parameters. In some cases, the resource allocation indicator may identify an aggregation level of a plurality of different aggregation levels for transmitting the UCI to indicate the total number of resource elements.

The UE 215 may adjust one or more transmission parameters of the plurality of transmission parameters, and transmit the autonomous uplink transmission in accordance with the adjusted one or more transmission parameters. In some cases, the UE 215 may adjust the one or more transmission parameters based on a link quality measurement, or an amount of uplink data available to send in the autonomous uplink transmission, or power headroom, or any combination thereof.

Figure 4A:
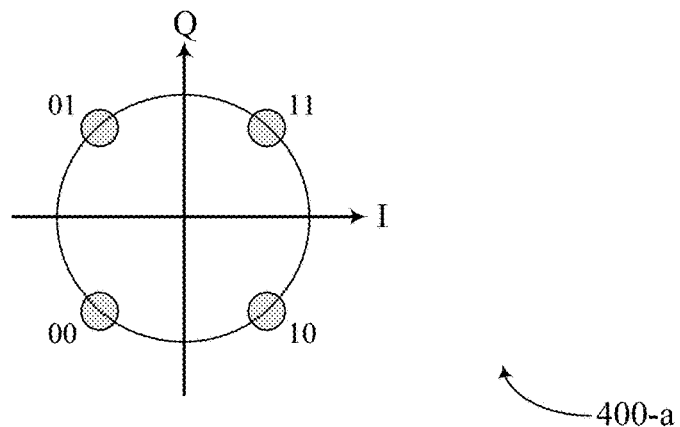
FIGS. 4A through 4C illustrate examples of a configuration that support UCI in autonomous uplink in accordance with various aspects of the present disclosure.

The UE 215 may modulate the UCI, prior to transmitting to the base station 205. In some cases, since the MCS may be modified by the UE 215, the UCI may be independent of a MCS used for uplink data of the autonomous uplink transmission. FIG. 4A illustrates an example of a constellation diagram 400-a that supports UCI in autonomous uplink in accordance with various aspects of the present disclosure. In some examples, the constellation diagram 400-a may implement aspects of the wireless communication system 100 and 200. With reference to FIG. 2, the UE 215 may modulate a sequence of bits onto a carrier signal, for example, UCI bits, by adjusting parameters of the carrier signal. In some cases, the UE 215 may apply QPSK modulation, which takes the incoming bits two at a time, and transmit the modulated bits using a signal that can have four different states, which are known as symbols. Each symbol may be described using two numbers. These can either be the amplitude and initial phase of the resulting signal. In some cases, the UE 215 may use QPSK modulation for each of UCI and uplink data.

In QPSK modulation, the symbols may have the same amplitude and initial phase of 45°, 135°, 225° and 315°, which corresponds to bit combinations of 00, 10, 11 and 01 respectively. These four QPSK symbols may be represented using the constellation diagram. The constellation diagram 400-a shows the amplitude of the I signal at the x-axis, and the amplitude of the Q signal at the y-axis, for each symbol. As such, in the constellation diagram 400-a, the distance of each symbol from the origin represent the amplitude of the transmitted signal, while the angle represents its initial phase. The UE 215 may modulate a signal carrying the UCI according to the constellation diagram 400-a. The constellation diagram 400-a may be associated with a QPSK MCS, which the UE 215 may use to modulate the signal carrying the UCI. For example, a transmitter of the UE 215 may receive a stream of bits from a higher layer protocol, calculate the resulting symbols, and modulate the carrier signal by mixing the symbols and the carrier together. In some cases, the UE 215 may modulate the UCI and uplink using QPSK modulation. In some examples, the UE 215 may use a higher order MCS to modulate the uplink data, and a sub-constellation of the higher order MCS to modulate the UCI.

Figure 4B:
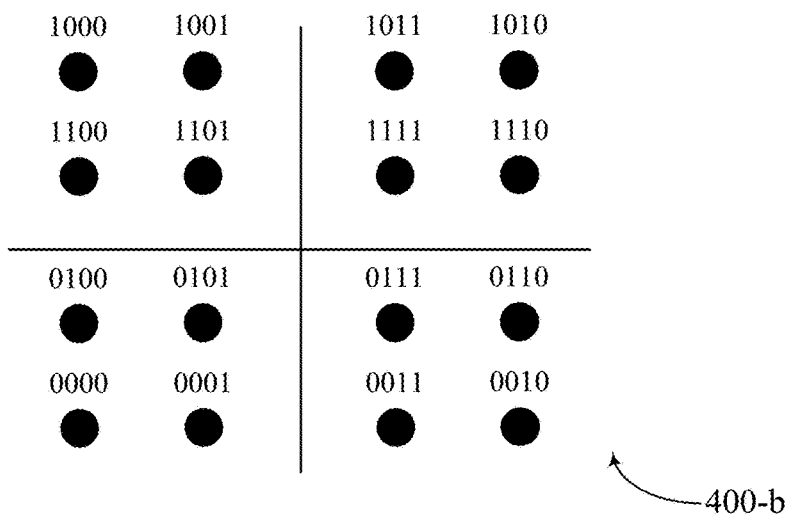

FIG. 4B illustrates examples of a constellation diagram 400-b that support UCI in autonomous uplink in accordance with various aspects of the present disclosure. In some examples, the constellation diagram 400-b may implement aspects of the wireless communication system 100 and 200. Constellation diagram 400-b illustrates an example constellation diagram of a 16-QAM MCS. Other MCS's, and corresponding constellation diagrams, may also be used. The UE 215 may modulate the UCI according to a QPSK sub-constellation associated with the 16-QAM MCS. For example, the QPSK sub-constellation used to modulate the UCI may be the upper right of constellation diagram 400-b, corresponding to sequences 1011, 1010, 1111, and 1110. The remaining constellation points of constellation diagram 400-b may be used for modulating uplink data of the autonomous uplink transmission. Prior to communicating, the base station 205 and the UE 215 may agree on the modulation to be used (e.g., via RRC signaling). For example, the base station 205 and the UE 215 may agree that UCI may be QPSK modulated using a first sub-constellation of a data modulation constellation, and that uplink data of the autonomous uplink transmission may be modulated using a modulation order indicated in the UCI (e.g., the 16-QAM MCS). In another example, the UE 215 may signal the modulation order transmission parameter for the uplink data in the UCI.

Figure 4C:
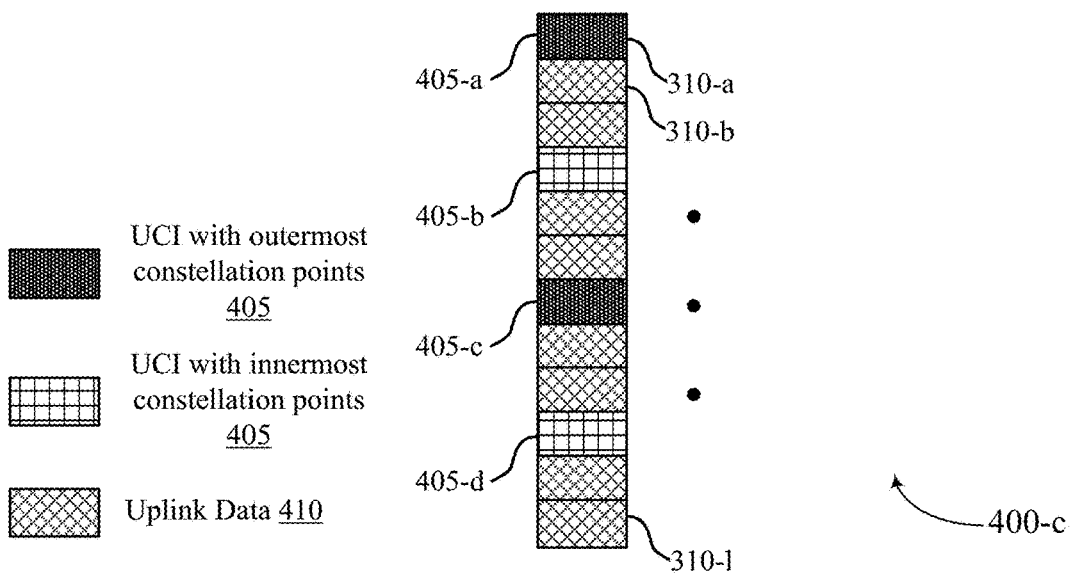

FIG. 4C illustrates examples of a configuration 400-c that supports UCI in autonomous uplink in accordance with various aspects of the present disclosure. In some examples, the configuration 400-c may implement aspects of the wireless communication system 100 and 200. In some cases, the configuration 400-c may illustrate an example of UCI constellation mapping.

In an example, the UE 215 may modulate UCI using QPSK modulation. A QPSK constellation for UCI may have its own traffic-to-pilot power ratio (TPR), and as such may not share the same constellation points as the uplink data of the autonomous uplink transmission. In some examples, tones (e.g., sub-carriers) used to transport UCI may be sent at a higher power level as compared to tones used to transport uplink data.

In another example, UCI and uplink data may share the same constellation points. A QPSK constellation used for modulating UCI may be a sub-constellation in a QAM constellation, where the sub-constellation is selected to provide a defined (e.g., maximum) distance between the UCI constellation points and uplink data constellation points of the QAM. In some cases, selecting a sub-constellation may introduce power fluctuation between UCI 405 and uplink data 410.

In another example, the sub-constellation for UCI may be different for different UCI modulation symbols to avoid power fluctuation between UCI and data. Configuration 400-c may depict a set of RB s 310-a, 310-b, . . . , 310-l, and the constellation points used to modulate UCI may alternate to avoid power fluctuation. For example, UCI 405-a and 405-c may be modulated with the outermost four constellation points of a constellation diagram, and UCI 405-b and 405-d may be modulated with the inner most four constellation points of a constellation diagram.

Figure 5:
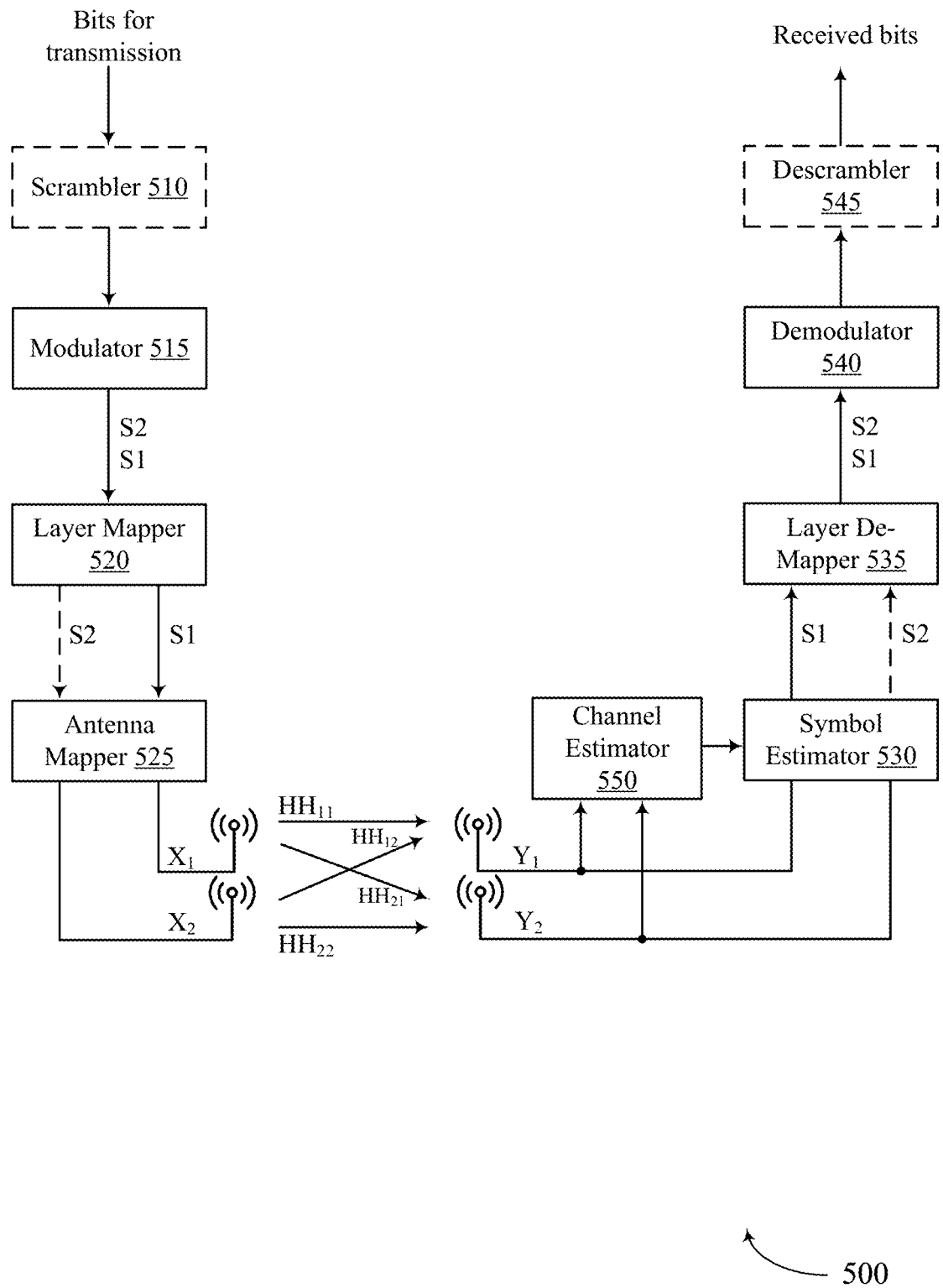
FIG. 5 illustrates an example of a configuration that supports UCI in autonomous uplink in accordance with aspects of the present disclosure.

The UE 215 may also adjust a rank used for generating an automated uplink transmission and indicate the rank used in the UCI. FIG. 5 illustrates an example of a configuration 500 that supports UCI in autonomous uplink in accordance with various aspects of the present disclosure. In some examples, the configuration 500 may implement aspects of the wireless communication system 100 and 200. The configuration 500 may illustrate a spatial multiplexing that supports UCI in autonomous uplink.

The base station 205 and the UE 215 may use multiple antennas to realize multiple parallel data streams between them, so as to increase a data rate. In the depicted example, UE 215 may include a scrambler 510, a modulator 515, a layer mapper 520, and an antenna mapper 525. Base station 205 may include a channel estimator 550, a symbol estimator 530, a layer de-mapper 535, a demodulator 540, and a descrambler 545.

At the UE 215, a scrambler 510 may receive a bit stream for transmission. For example, the bit stream may be a sequence of DCI bits, a sequence of uplink bits for the autonomous uplink transmission, or both. In some examples, the scrambler 510 may scramble the UCI bits with a scrambling sequence. If scrambler 510 is included in UE 215, the base station 205 may include a descrambler 545 that receives a bit stream from the demodulator 540 and applies a complimentary descrambling operation to generate a descrambled bit stream. The scrambler 510 may forward the scrambled bit sequence (e.g., UCI scrambled bits sequence) to the modulator 515. The scrambler 510 is optional and may be omitted.

The modulator 515 may modulate the bit sequence, for example, according to a MCS such as QPSK or QAM. For example, the modulator 515 may apply QPSK modulation, which takes the incoming bits two at a time and transmit then using a signal that can have four different states, which as known as symbols. Each symbol may be described using two numbers. These can either be the amplitude and initial phase of the resulting signal. In some examples, modulator 515 of the UE 215 may modulate the UCI using a same modulation order in each layer of a set of layers, where a total number of layers corresponds to the selected rank.

The modulator 515 may forward the modulated symbols to the layer mapper 520 for mapping the modulated symbols to one or more layers, where the number of layers depends on a rank. The antenna mapper 525 may map symbols from the layer mapper 520 and transmits one symbol to each antenna for transmission an OFDM waveform or a SC-FDM waveform. In some examples, the UE 215 may transmit, in accordance with the plurality of transmission parameters, the autonomous uplink transmission as an OFDM waveform or a SC-FDM waveform.

In some examples, a transmission rank may be greater than 1. The layer mapper 520 may map uplink data to two or more layers for transmission, and map the UCI to a first layer for sending UCI as a rank 1 transmission. In a two layer example (e.g., rank 2 transmission), the UCI may be mapped to layer 1 for transmission, and uplink data may be mapped to both layer 1 and layer 2 for transmission. In layer 1, layer mapper 520 may rate match uplink data around the resource elements associated with the UCI in layer 1. Thus, uplink data may be mapped to a portion of the remaining resource elements of the resource allocation of layer 1 that are not allocated to UCI. In this example, layer 2 may not include UCI, and the uplink data may be communicated in up to all of the resource elements of the resource allocation of layer 2.

This example may be extended to any number of layers, where layer mapper 520 may rate match uplink data around the resource elements associated with the UCI in layer 1, and may map uplink data to up to all of the resource elements of the resource allocation in each of the higher layers. In some cases, a total number of the layers corresponds to the rank of the transmission. In an example, UCI and uplink data may be mapped to a first layer for transmission, and the uplink data may be mapped to multiple layers that include the first layer, where the total number of the multiple layers corresponds to the rank of the autonomous uplink transmission. The uplink data may be the same in multiple layers to provide transmission diversity, or some or up to all of the uplink data may be different in each layer.

The antennas transmit the two symbols simultaneously, so as to increase the transmitted data rate as a function of the rank. In the example, UE 215 includes two antennas. The symbols travel to receive antennas by way of four separate communication paths, $X_1$ and $X_2$ are the signals transmitted from the two transmit antennas associated with the UE 215, $Y_1$ and $Y_2$ are the signals that arrive at the two receive antennas associated with the base station 205. $H_{ij}$ expresses the way in which a transmitted symbol is attenuated and phase-shifted, as it travels to a receive antenna of the base station 205 from the transmit antenna of the UE 215.

Channel estimator 550 of the base station 205 may calculate a channel estimation of the channel element $H_{ij}$ (e.g., $H_{11}$, $H_{12}$, $H_{21}$, and $H_{22}$). In some cases, the channel estimates of the channel elements may be small but non-zero, as such the $Y_1$ and $Y_2$ signals may be corrupted by noise and are completely unusable. The channel estimator 550 may perform channel estimation corresponding to a resource allocation of the UE 215. The symbol estimator 530, in conjunction with the channel estimator 550, monitor and extract symbols from the resource allocation. The layer de-mapper 535 may perform the complementary operation of the layer mapper 520 by extracting symbols from one or more layers. The demodulator 540 of the base station 205 may demodulate the extracted symbols.

To receive the autonomous uplink transmission, the base station 205 may process the UCI to determine the one or more transmission parameters. For example, the base station 205 may process the UCI to determine a rank indicator, a MCS, a scrambling sequence, or the like, for the autonomous uplink transmission transmitted within the resource allocation, and the layer de-mapper 535, the demodulator 540, and the descrambler 545 may respectively use the rank indicator, the MCS, and the scrambling sequence during decoding of the autonomous uplink transmission.

In some examples, UE 215 may select a rank for the autonomous uplink transmission (e.g., based on link quality, amount of available uplink data for transmission, power headroom, etc.), and transmit the autonomous uplink transmission that is generated in accordance with the selected rank and the plurality of transmission parameters. The UCI may be transmitted in accordance with the selected rank and at least one of the plurality of transmission parameters may indicate the selected rank. In some cases, the UCI may use a first rank that is higher than a second rank used for transmitting the UCI. The autonomous uplink transmission may be generated in accordance with the plurality of transmission parameters.

In some examples, various different rank combinations may be used for UCI and uplink data. In an example, the UE 215 may transmit UCI as a fixed rank 1 transmission. To do so, layer mapper 520 may map the UCI symbols as a rank 1 transmission (e.g., map to a single layer). The base station 205 may, for example, configure the UE 215 to transmit the UCI as a rank 1 transmission (via RRC signaling, DCI, etc.). In another example, the UE 215 may select to transmit the UCI as a rank 1 transmission, and indicate in the UCI that the RI transmission parameter is rank 1 for UCI. The base station 205 may process the UCI to determine the indicated RI transmission parameter for decoding of the autonomous uplink transmission.

In some examples, the UE 215 may rate match uplink data around UCI resource elements. As described above, the UE 215 may determine the total number of resource elements of the resource allocation to allocate to UCI, and may rate match uplink data around the UCI resource elements in the remaining resource elements of the resource allocation. The base station 205 perform de-rate matching in accordance with the total number of resource elements of the resource allocation allocated to UCI to identify and decode the resource elements transporting the autonomous uplink transmission.

The UE 215 may in some cases, transmit DMRS embedded within the UCI. For example, the UE 215 may embed DMRS within the number of resource elements of the resource allocated to UCI (e.g., within anchor resources 350). In some cases, antenna mapper 525 may map UCI, DMRS, and uplink data to a common port. For example, the UE 215 may transmit, via a same port used for transmitting the UCI, a demodulation reference signal and the autonomous uplink transmission that is generated in accordance with the plurality of transmission parameters.

In some cases, the UE 215 may transmit UCI resource elements as a rank 1 transmission. In situations when the autonomous uplink transmission is a higher layer (e.g., has a higher rank), the other layers (e.g., the one or more higher layers) may be used for the transmission of the uplink data. Layer mapper 520, for example, may map UCI symbols to a single layer (e.g., as a rank 1 transmission) and may uplink data symbols to two or more layers for transmitting uplink data as a higher layer transmission. The UE 215 may indicate in the UCI that the RI transmission parameter is rank 1 for UCI, and a higher rank for the uplink data. In addition, the antenna mapper 525 may share DMRS ports between UCI and autonomous uplink data.

The base station 205 may process the UCI to determine the RI transmission parameter for UCI and uplink data, and the layer de-mapper 535 may accordingly perform inverse mapping operations as performed by the layer mapper 520. For example, if the rank indicator indicates that the layer mapper 520 mapped uplink data to two or more layers for transmission, and mapped the UCI to a first layer for sending UCI as a rank 1 transmission, the layer de-mapper 535 may de-map the layers in accordance with rank indicator to obtain the UCI from layer 1, and the uplink data from the two or more layers, including layer 1.

In some examples, the UCI may follow the rank used for the uplink data. In an example, a same modulation order may be repeated over multiple layers such that each layer is self-decodable as the UE 215 is not aware of UCI rank a priori. For example, the modulator 515 may apply a same modulation order to modulate the bits for each layer of a set of layers (e.g., apply QPSK modulation), where the number of layers depends on the rank used for the uplink data. The demodulator 540 may similarly apply a same modulation order to each layer of a set of layers to de-modulate the symbols of each layer. In some cases, the scrambler 510 may apply layer specific scrambling to randomize interference across different layers when a same modulation order is used for multiple layers. For example, the scrambler 510 may apply a different scrambling sequence of a set of scrambling sequences to bits mapped to each layer to randomize interference across different layers. In some cases, the scrambler 510 may apply a different scrambling sequence of a plurality of scrambling sequences to the UCI transmitted in each layer of a plurality of layers, where a total number of the plurality of layers corresponds to the selected rank. The UE 215 may indicate in UCI the scrambling sequence that was applied by the scrambler 510. The base station 205 may process the UCI to determine the scrambling sequence transmission parameter and the descrambler 545 may apply that sequence during descrambling.

In some examples, the UE 215 may transmit a different redundancy version (RV) of UCI on a different layer of a set of layers. For example, each layer may correspond to a predetermined redundancy version identifier (RVID), and the layer mapper 520 may map UCI symbols of different RVs to respective layers. Mapping different RVs in this manner may avoid the UE 215 having to perform different rate matching on different UCI ranks, and beneficially each layer is self-decodable by the base station 205 without the base station 205 knowing the rank of the UCI applied by the UE 115 to generate the UCI transmission. In some examples, the antenna mapper 525 may map DMRS, UCI, and uplink data to a set of common ports. In some cases, the UE 215 may also generate a plurality of redundancy versions for the UCI. As such, the UE 215 may transmit a different redundancy version of the plurality of redundancy versions on a respective layer of a plurality of layers. In some examples, the UE 215 may indicate in UCI which RVID was sent on which layer. The base station 205 may process the UCI to determine the which RVID was sent on which layer and the layer de-mapper 535 may de-map the layers accordingly.

Figure 6:
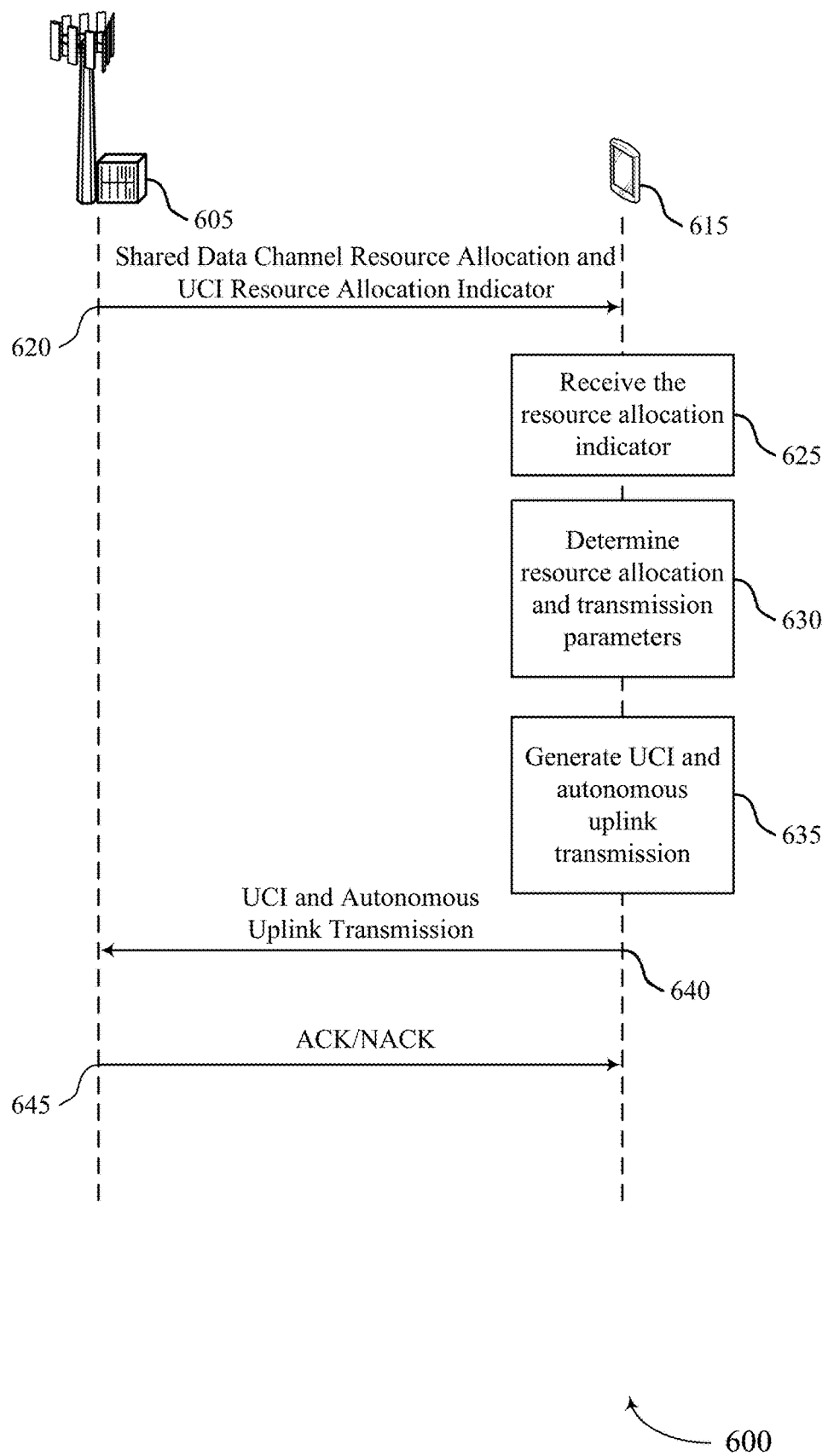
FIG. 6 illustrates an example of a process flow that supports UCI in autonomous uplink in accordance with aspects of the present disclosure.

FIG. 6 illustrates an example of a process flow 600 that supports UCI in autonomous uplink in accordance with various aspects of the present disclosure. In some examples, the process flow 600 may implement aspects of the wireless communication system 100 and 200. Base station 605 and UE 615 may be examples of the corresponding devices described with reference to FIGS. 1 and 2.

In the following description of the process flow 600, the operations between the base station 605 and the UE 615 may be transmitted in a different order than the exemplary order shown, or the operations performed by the base station 605 and the UE 615 may be performed in different orders or at different times. Certain operations may also be left out of the process flow 600, or other operations may be added to the process flow 600.

At 620, the base station 605 may transmit a resource allocation in a shared data channel and a resource allocation indicator to the UE 615. The resource allocation may indicate resources within the shared data channel in which the UE 615 may use to transmit an autonomous uplink transmission. For example, the UE 615 may receive a PUSCH resource allocation from the base station 605. The base station 605 may also inform the UE 615 of a time window within which the UE 615 may contend to use the resource allocation in the shared data channel. In some examples, the UE 615 may, for example, perform a LBT protocol to prior to transmitting an autonomous uplink transmission within the resource allocation. The resource allocation indicator may identify the a total number of resource elements of the resource allocation to allocate for a UCI transmission, or include a set of nominal parameters for calculating the total number of resource elements of the resource allocation to allocate for the UCI transmission. At 625, the UE 615 may receive the resource allocation indicator from the base station 605.

At 630, the UE 615 may determine the resource allocation and the transmission parameters for an autonomous uplink transmission. For example, the UE 615 may calculate a total number of resource elements to allocate for UCI within a resource allocation of a PUSCH. The resource allocation may correspond to a plurality of symbol periods within a plurality of RBs. The UE 615 may determine, based on the total number of resource elements, a plurality of transmission parameters to be used for generating an autonomous uplink transmission. The transmission parameters may indicate a MCS, or a modulation type, or a RI, or at least a portion of the resource allocation being utilized, or a PMI, or a waveform type, or any combination thereof, for the autonomous uplink transmission.

For example, the UE 615 may use a higher modulation and/or a coding scheme to be used for generating the autonomous uplink transmission using the remaining resource elements of the resource allocation due to a communication link with the base station 605 currently experiencing a higher signal to noise and/or plus interference level. Conversely, the UE 615 may use a lower modulation and/or a coding scheme to be used for generating the autonomous uplink transmission using the remaining resource elements of the resource allocation due to a communication link with the base station 605 currently experiencing a lower signal to noise and/or plus interference level.

In another example, the UE 615 may use a higher rank for generating the autonomous uplink transmission using the remaining resource elements of the resource allocation due to a communication link with the base station 605 currently experiencing a higher signal to noise and/or plus interference level. Conversely, the UE 615 may use a lower rank for generating the autonomous uplink transmission using the remaining resource elements of the resource allocation due to a communication link with the base station 605 currently experiencing a lower signal to noise and/or plus interference level.

In a further example, the UE 615 may determine to use a subset of its resource allocation (e.g., either in time and/or frequency) for generating the autonomous uplink transmission using the remaining resource elements of the resource allocation due to having less available uplink data to send and/or a lower power headroom.

At 635, the UE 615 may generate the UCI and the autonomous uplink transmission. For example, the UE 615 may generate the UCI to indicate the determined transmission parameters (e.g., MCS, RI, power headroom, portion of resource allocation being used, etc.) for the autonomous uplink transmission. The UE 615 may also generate the autonomous uplink transmission in accordance with the determined transmission parameters. At 640, the UE 615 may transmit the UCI and the autonomous uplink transmission to the base station 605 within at least a portion of the resource allocation. At 645, the base station 605 may transmit an acknowledgment or negative acknowledgment (ACK/NACK) to the UE 615 to indicate whether the autonomous uplink transmission was successfully received.

Beneficially, a UE may autonomously determine one or more transmission parameters to use for generating an autonomous uplink transmission, and may signal the one or more transmission parameters to a base station in UCI to enable the base station to decode the autonomous uplink transmission. This efficient coordination may improve channel utilization in an unlicensed spectrum for the UE, by permitting a UE to autonomous adjust the one or more transmission parameters.

Figure 7:
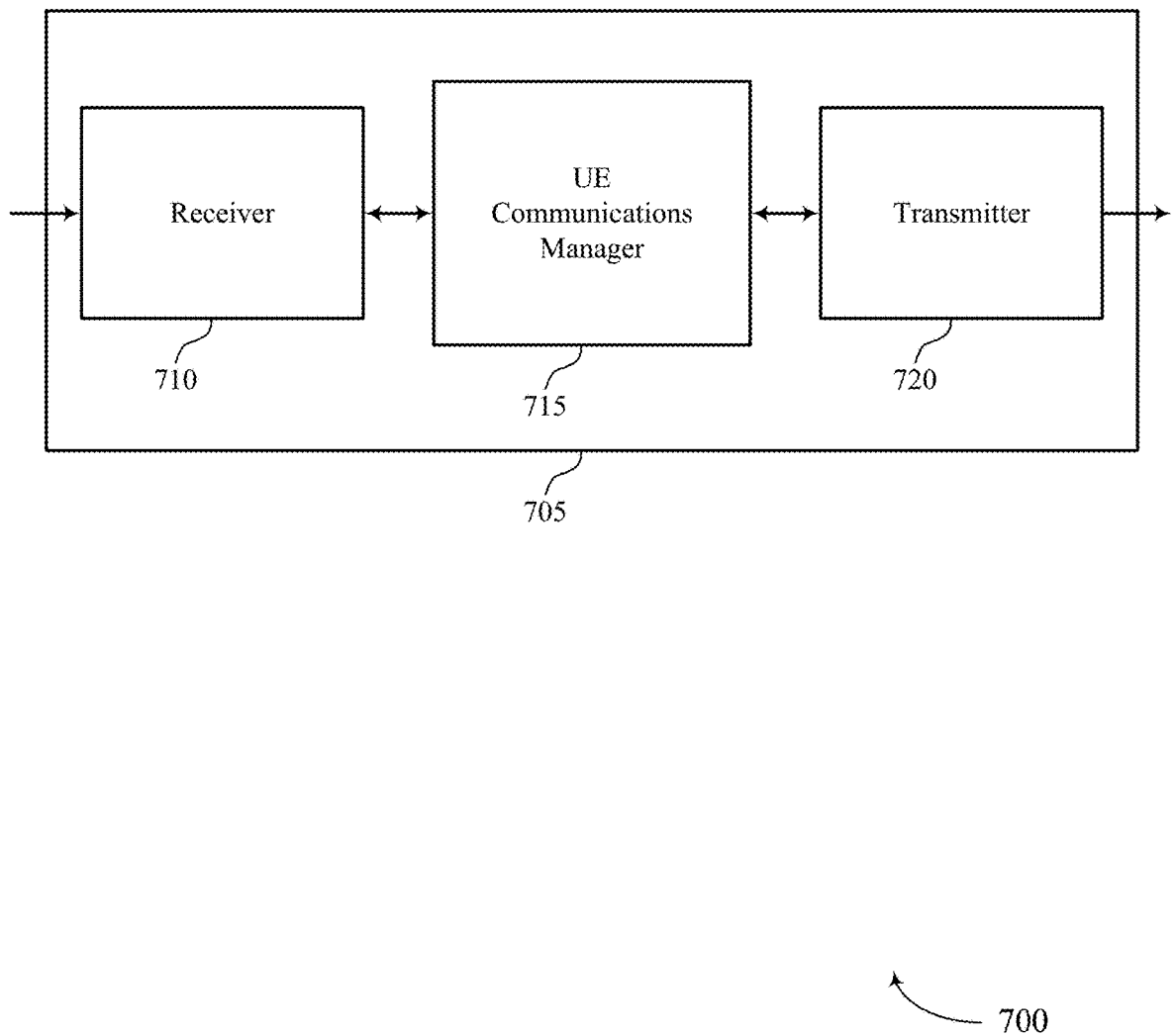
FIGS. 7 through 9 show block diagrams of a device that supports UCI in autonomous uplink in accordance with aspects of the present disclosure.

FIG. 7 shows a block diagram 700 of a wireless device 705 that supports UCI in autonomous uplink in accordance with aspects of the present disclosure. Wireless device 705 may be an example of aspects of a user equipment (UE) 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to UCI in autonomous uplink, etc.). Information may be passed on to other components of the device. The receiver 710 may receive, from a base station, a resource allocation indicator corresponding to a total number of resource elements to allocate for uplink control information within a resource allocation of a shared data channel. The receiver 710 may be an example of aspects of the transceiver 1035 described with reference to FIG. 10. The receiver 710 may utilize a single antenna or a set of antennas.

UE communications manager 715 may be an example of aspects of the UE communications manager 1015 described with reference to FIG. 10. UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device (PLD), discrete gate or transistor logic, discrete hardware components, or any combination thereof designed to perform the functions described in the present disclosure.

The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may determine anchor resources within the resource allocation and determine a set of transmission parameters for an autonomous uplink transmission based on the total number of resource elements.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

The transmitter 720 may transmit, to the base station, the uplink control information within the anchor resources to indicate the set of transmission parameters for the autonomous uplink transmission. The transmitter 720 may transmit the autonomous uplink transmission within the resource allocation, transmit the uplink control information in accordance with a defined rank. The transmitter 720 may transmit a demodulation reference signal embedded within the uplink control information. The transmitter 720 may transmit, via a same port used for transmitting the uplink control information, a demodulation reference signal and the autonomous uplink transmission that is generated in accordance with the set of transmission parameters.

The transmitter 720 may transmit, using a first rank that is higher than the defined rank used for transmitting the uplink control information, the autonomous uplink transmission that is generated in accordance with the set of transmission parameters. The transmitter 720 may transmit, via a set of ports used for transmitting the uplink control information, a demodulation reference signal and the autonomous uplink transmission that is generated in accordance with the set of transmission parameters. The transmitter 720 may transmit the autonomous uplink transmission that is generated in accordance with the selected rank and the set of transmission parameters, where the uplink control information is transmitted in accordance with the selected rank and at least one of the set of transmission parameters indicates the selected rank.

The transmitter 720 may transmit a demodulation reference signal via a set of ports used for transmitting the autonomous uplink transmission and the uplink control information. The transmitter 720 may transmit, in accordance with the set of transmission parameters, the autonomous uplink transmission as an OFDM waveform or a SC-FDM waveform.

Figure 8:
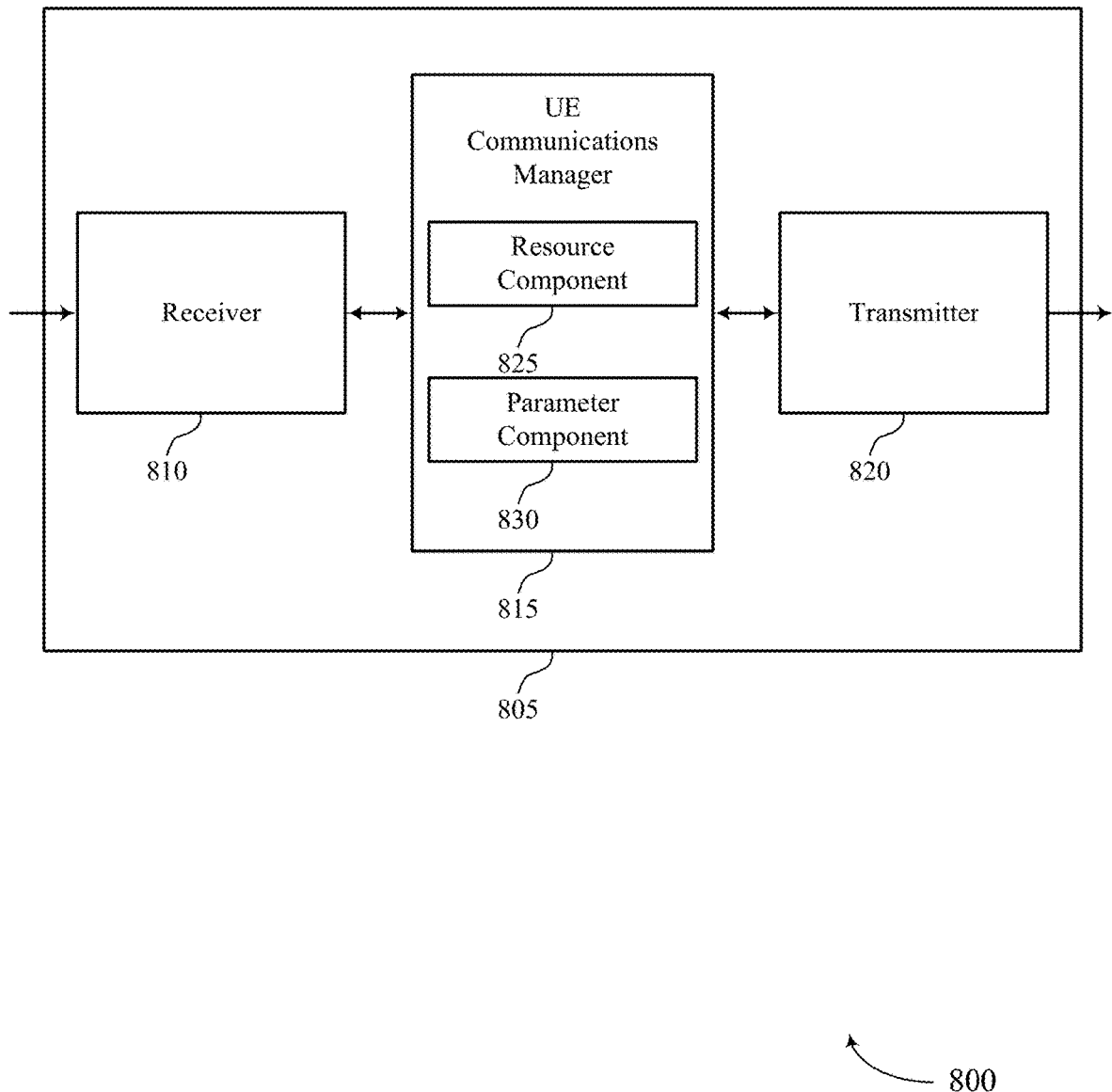

FIG. 8 shows a block diagram 800 of a wireless device 805 that supports UCI in autonomous uplink in accordance with aspects of the present disclosure. Wireless device 805 may be an example of aspects of a wireless device 705 or a UE 115 as described with reference to FIG. 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to UCI in autonomous uplink, etc.). Information may be passed on to other components of the device. The receiver 810 may be an example of aspects of the transceiver 1035 described with reference to FIG. 10. The receiver 810 may utilize a single antenna or a set of antennas.

UE communications manager 815 may be an example of aspects of the UE communications manager 1015 described with reference to FIG. 10. UE communications manager 815 may also include resource component 825 and parameter component 830.

Resource component 825 may determine anchor resources within the resource allocation. The resource component 825 may process the resource allocation indicator to determine one or more nominal parameters, and calculate the total number of resource elements based on the one or more nominal parameters. In some cases, the resource allocation indicator specifies the total number of resource elements. In some cases, the resource allocation indicator specifies an aggregation level of a set of different aggregation levels for transmitting the uplink control information to indicate the total number of resource elements.

Parameter component 830 may determine a set of transmission parameters for an autonomous uplink transmission based on the total number of resource elements and generate the autonomous uplink transmission in accordance with the set of transmission parameters. In some cases, the set of transmission parameters indicate a MCS, or a modulation type, or a RI, or at least a portion of the resource allocation being utilized, or a PMI, or a waveform type, or any combination thereof, for the autonomous uplink transmission. In some cases, at least one of the set of transmission parameters indicates that the autonomous uplink transmission is transmitted using a portion of the resource allocation.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
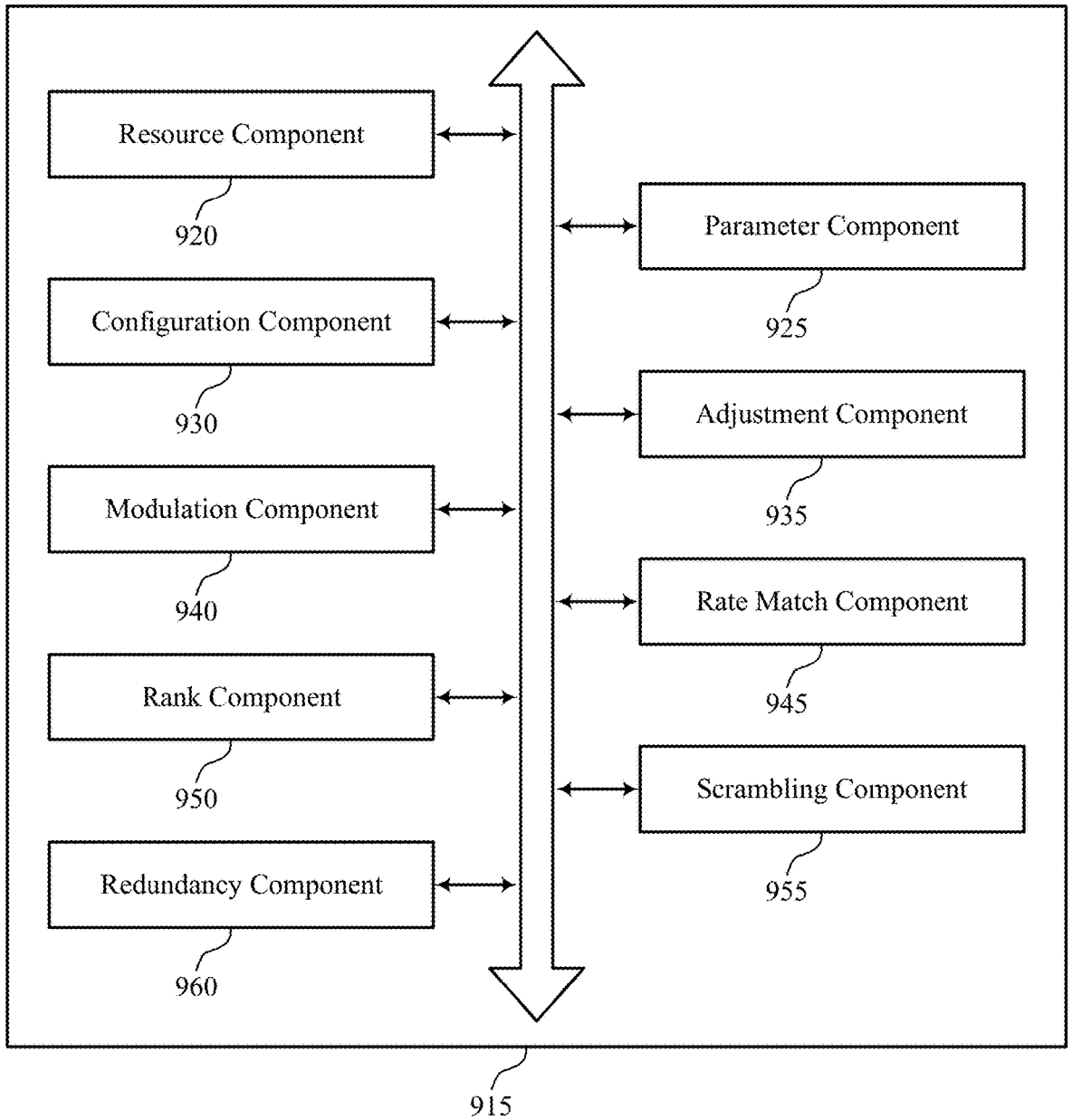

FIG. 9 shows a block diagram 900 of a UE communications manager 915 that supports UCI in autonomous uplink in accordance with aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include resource component 920, parameter component 925, configuration component 930, adjustment component 935, modulation component 940, rate match component 945, rank component 950, scrambling component 955, and redundancy component 960. Each of these modules may communicate, directly or indirectly, with one another (e.g., via one or more buses).

Resource component 920 may determine anchor resources within a resource allocation. The resource component 920 may process the resource allocation indicator to determine one or more nominal parameters, and calculate the total number of resource elements based on the one or more nominal parameters. In some cases, the resource allocation indicator specifies the total number of resource elements. In some cases, the resource allocation indicator specifies an aggregation level of a set of different aggregation levels for transmitting the uplink control information to indicate the total number of resource elements.

Parameter component 925 may determine a set of transmission parameters for an autonomous uplink transmission based on the total number of resource elements and generate the autonomous uplink transmission in accordance with the set of transmission parameters. In some cases, the set of transmission parameters indicate a MCS, or a modulation type, or a RI, or at least a portion of the resource allocation being utilized, or a PMI, or a waveform type, or any combination thereof, for the autonomous uplink transmission. In some cases, at least one of the set of transmission parameters indicates that the autonomous uplink transmission is transmitted using a portion of the resource allocation.

Configuration component 930 may receive configuration information indicating the anchor resources within the resource allocation. In some cases, the resource allocation corresponds to a set of symbol periods within a set of resource blocks and, and where the anchor resources correspond to a subset of the set of resource blocks and a subset of the set of symbol periods.

Adjustment component 935 may adjust one or more transmission parameters of the set of transmission parameters. In some examples, transmitting the autonomous uplink transmission may be in accordance with the adjusted one or more transmission parameters. In some cases, transmitting the uplink control information may include transmitting the uplink control information in a first layer corresponding to a defined rank. In some cases, transmitting the uplink control information may include transmitting uplink data in a plurality of layers that includes the first layer, where the uplink data is rate matched around resource elements associated with the uplink control information in the first layer, and where a total number of the plurality of layers corresponds to a first rank that is higher than the defined rank. The adjustment component 935 may adjust the one or more transmission parameters based on a link quality measurement, or an amount of uplink data available to send in the autonomous uplink transmission, or power headroom, or any combination thereof.

Modulation component 940 may modulate the uplink control information with QPSK modulation. The modulation component 940 may modulate the uplink control information using a same modulation order in each layer of a set of layers, where a total number of the set of layers corresponds to the selected rank. In some cases, the uplink control information is QPSK modulated using a first sub-constellation of a data modulation constellation, and that uplink data of the autonomous uplink transmission is modulated using a modulation order indicated in the uplink control information.

Rate match component 945 may rate match uplink data of the autonomous uplink transmission around resource elements of the resource allocation allocated for transmitting the uplink control information. Rank component 950 may select a rank for the autonomous uplink transmission. Scrambling component 955 may apply a different scrambling sequence of a set of scrambling sequences to the uplink control information transmitted in each layer of a set of layers, where a total number of the set of layers corresponds to the selected rank.

Redundancy component 960 may generate a plurality of redundancy versions for the uplink control information, where transmitting the uplink control information may include transmitting a different redundancy version of the plurality of redundancy versions on a respective layer of a plurality of layers, where a total number of the set of layers corresponds to the selected rank.

Figure 10:
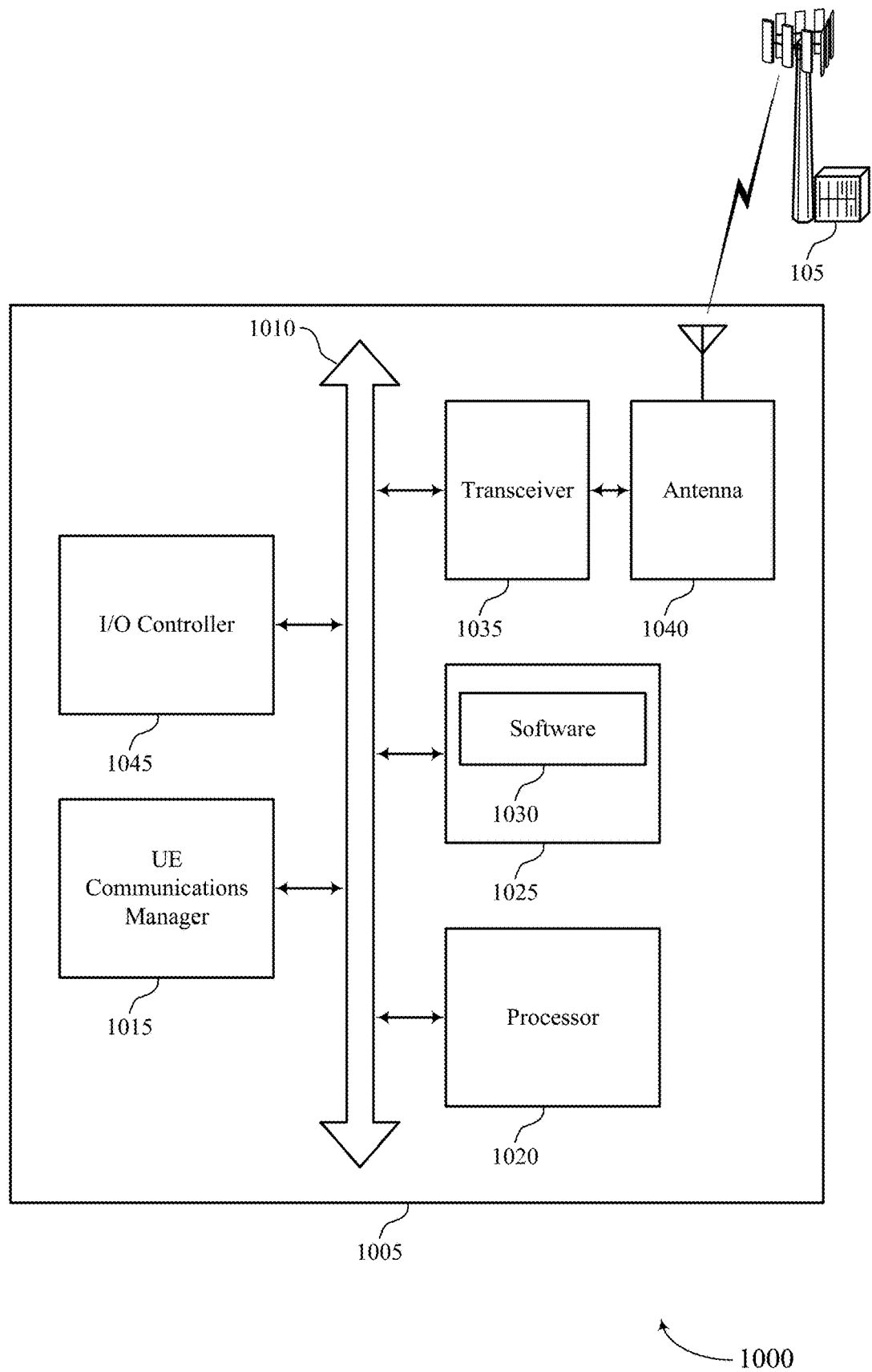
FIG. 10 illustrates a block diagram of a system including a UE that supports UCI in autonomous uplink in accordance with aspects of the present disclosure.

FIG. 10 shows a diagram of a system 1000 including a device 1005 that supports UCI in autonomous uplink in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting UCI in autonomous uplink).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support UCI in autonomous uplink. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
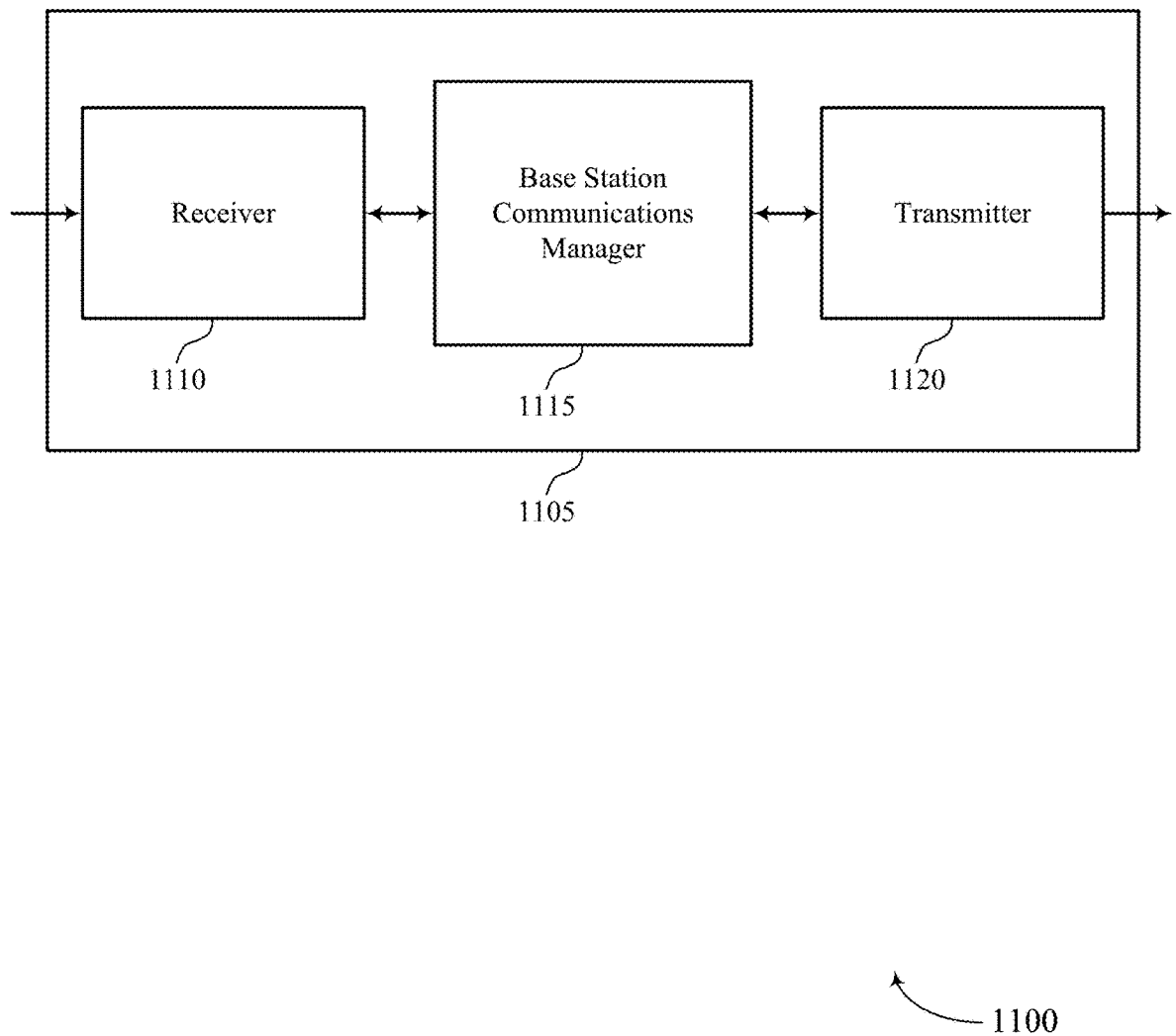
FIGS. 11 through 13 show block diagrams of a device that supports UCI in autonomous uplink in accordance with aspects of the present disclosure.

FIG. 11 shows a block diagram 1100 of a wireless device 1105 that supports UCI in autonomous uplink in accordance with aspects of the present disclosure. Wireless device 1105 may be an example of aspects of a base station 105 as described herein. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to UCI in autonomous uplink, etc.). Information may be passed on to other components of the device. The receiver 1110 may receive an autonomous uplink transmission as an OFDM waveform or a SC-FDM waveform. The receiver 1110 may be an example of aspects of the transceiver 1435 described with reference to FIG. 14. The receiver 1110 may utilize a single antenna or a set of antennas.

Base station communications manager 1115 may be an example of aspects of the base station communications manager 1415 described with reference to FIG. 14. Base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with various aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may configure a UE with anchor resources within a resource allocation for transmission of uplink control information, monitor the anchor resources of the resource allocation for the uplink control information that indicates a set of transmission parameters corresponding to the total number of the resource elements, and monitor the resource allocation for the autonomous uplink transmission generated in accordance with the set of transmission parameters.

Transmitter 1120 may transmit signals generated by other components of the device. The transmitter 1120 may transmit, to the UE, a resource allocation indicator corresponding to a total number of resource elements to allocate for uplink control information within a resource allocation of a shared data channel. In some cases, the resource allocation indicator specifies the total number of resource elements. In some cases, the resource allocation indicator includes one or more nominal parameters. In some cases, the resource allocation indicator specifies an aggregation level of a set of different aggregation levels for transmitting the uplink control information. In some cases, the uplink control information is modulated using QPSK modulation. In some cases, the uplink control information is QPSK modulated using a first sub-constellation of a data modulation constellation, and that uplink data of the autonomous uplink transmission is modulated using a modulation order indicated in the uplink control information. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
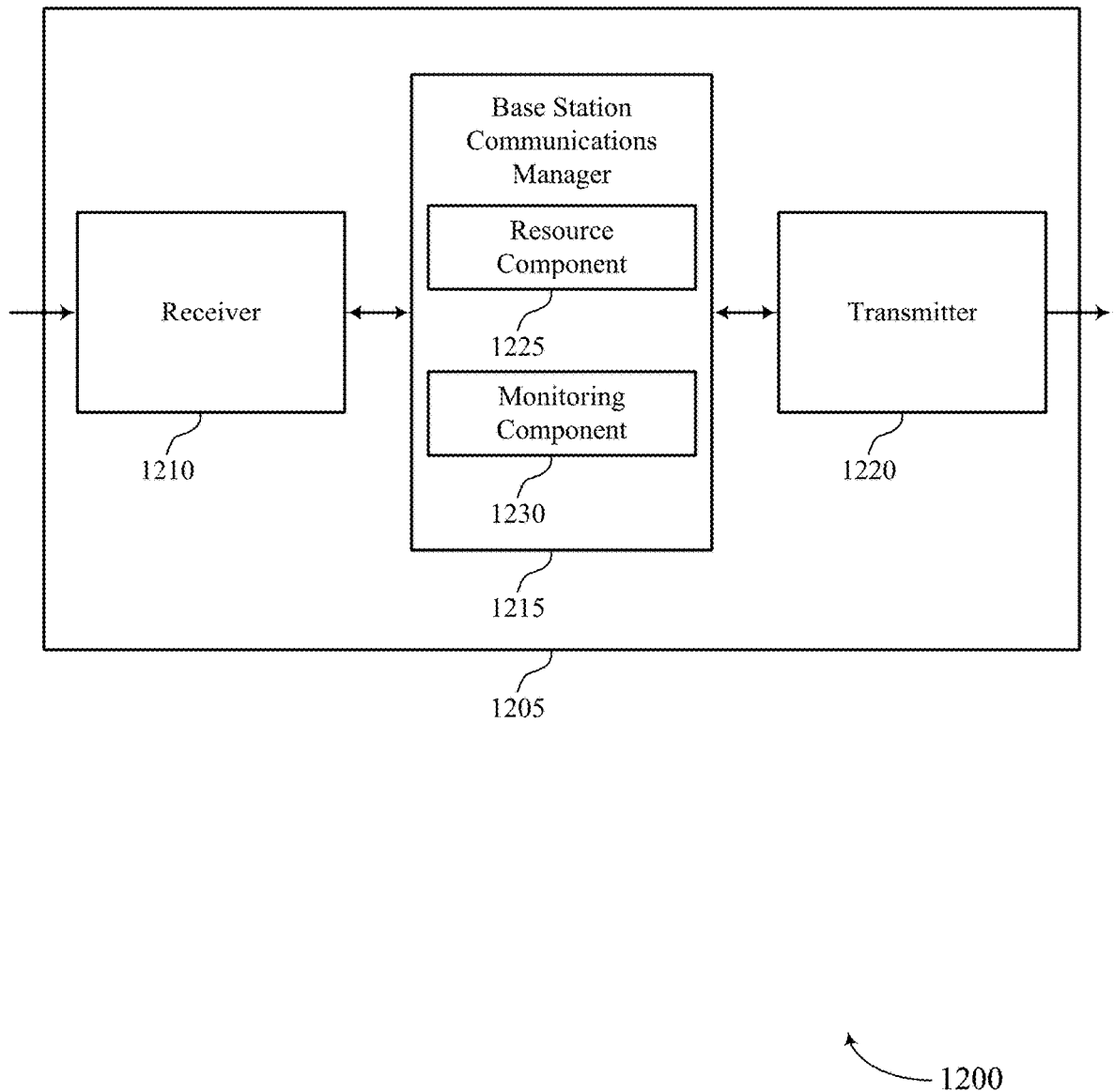

FIG. 12 shows a block diagram 1200 of a wireless device 1205 that supports UCI in autonomous uplink in accordance with aspects of the present disclosure. Wireless device 1205 may be an example of aspects of a wireless device 1105 or a base station 105 as described with reference to FIG. 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to UCI in autonomous uplink, etc.). Information may be passed on to other components of the device. The receiver 1210 may be an example of aspects of the transceiver 1435 described with reference to FIG. 14. The receiver 1210 may utilize a single antenna or a set of antennas.

Base station communications manager 1215 may be an example of aspects of the base station communications manager 1415 described with reference to FIG. 14. Base station communications manager 1215 may also include resource component 1225 and monitoring component 1230.

Resource component 1225 may configure a UE with anchor resources within a resource allocation for transmission of uplink control information. Monitoring component 1230 may monitor the anchor resources of the resource allocation for the uplink control information that indicates a set of transmission parameters corresponding to the total number of the resource elements. The monitoring component 1230 may monitor the resource allocation for an autonomous uplink transmission generated in accordance with the set of transmission parameters.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
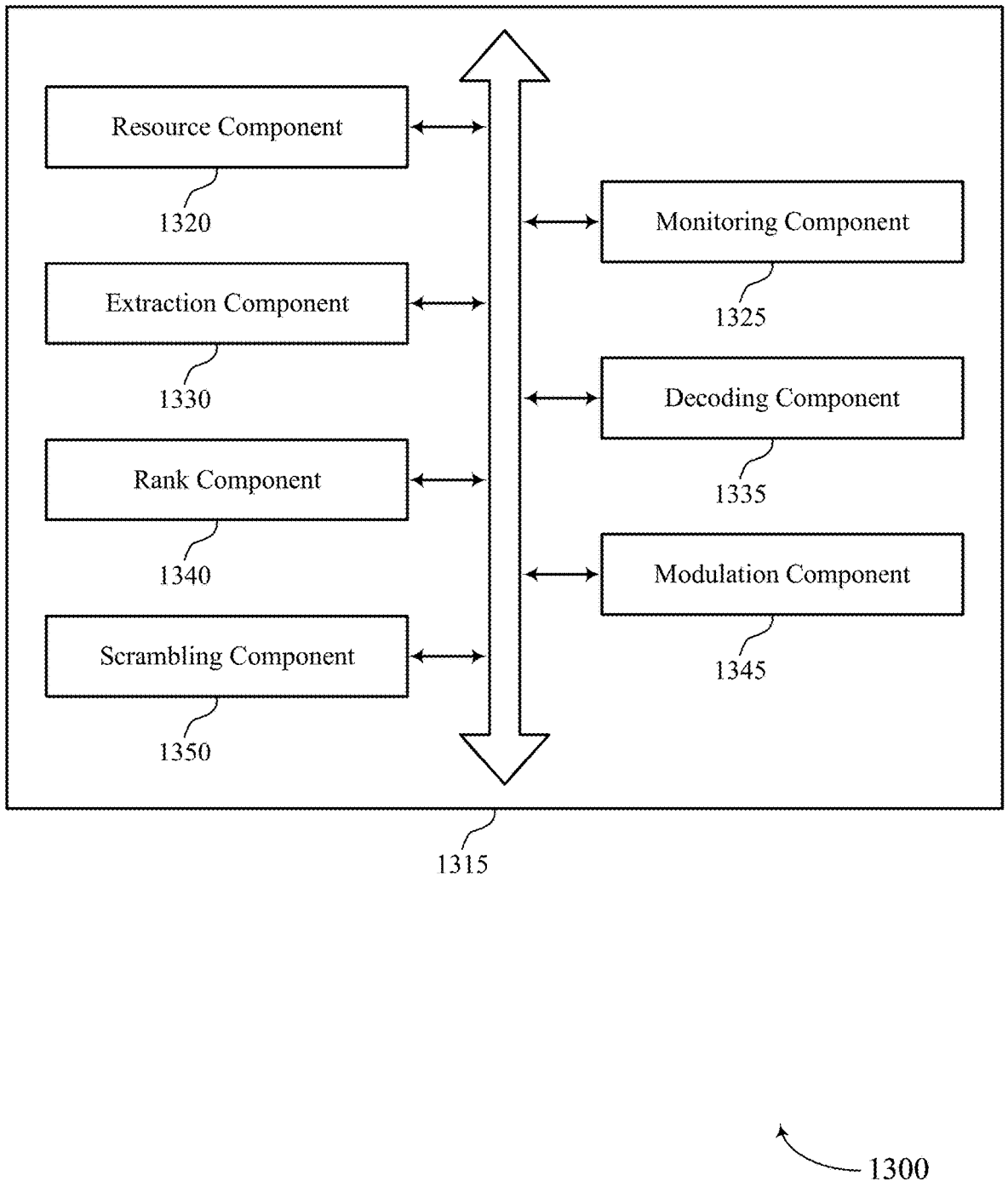

FIG. 13 shows a block diagram 1300 of a base station communications manager 1315 that supports UCI in autonomous uplink in accordance with aspects of the present disclosure. The base station communications manager 1315 may be an example of aspects of a base station communications manager 1415 described with reference to FIGS. 11, 12, and 14. The base station communications manager 1315 may include resource component 1320, monitoring component 1325, extraction component 1330, decoding component 1335, rank component 1340, modulation component 1345, and scrambling component 1350. Each of these modules may communicate, directly or indirectly, with one another (e.g., via one or more buses).

Resource component 1320 may configure a UE with anchor resources within a resource allocation for transmission of uplink control information. Monitoring component 1325 may monitor the anchor resources of the resource allocation for the uplink control information that indicates a set of transmission parameters corresponding to the total number of the resource elements and monitor the resource allocation for an autonomous uplink transmission generated in accordance with the set of transmission parameters. Extraction component 1330 may extract tones from the anchor resources to obtain the uplink control information.

Decoding component 1335 may blind decoding the anchor resources in accordance with a set of decoding hypotheses to obtain the uplink control information. The decoding component 1335 may decode the resource allocation in accordance with a first rank to obtain the uplink control information from a first layer. The decoding component 1335 may decode the resource allocation in accordance with a second rank that is higher than the first rank to obtain uplink data of the autonomous uplink transmission from a plurality of layers that includes the first layer. The decoding component 1335 may decode the resource allocation in accordance with the rank to obtain the uplink control information and uplink data of the autonomous uplink transmission. The decoding component 1335 may decode each layer of a set of layers of the resource allocation to obtain a different redundancy version of a set of redundancy versions for the uplink control information, where a total number of the set of layers corresponds to the rank.

Rank component 1340 may process at least one of the set of transmission parameters to determine a rank for the autonomous uplink transmission. Modulation component 1345 may apply a same modulation order to each layer of a set of layers of the resource allocation to de-modulate the resource allocation for obtaining the uplink control information, where a total number of the set of layers corresponds to the rank.

Scrambling component 1350 may apply a different scrambling sequence of a set of scrambling sequences to respectively descramble bits decoded from each layer of a set of layers of the resource allocation to obtain the uplink control information, where a total number of the set of layers corresponds to the rank.

Figure 14:
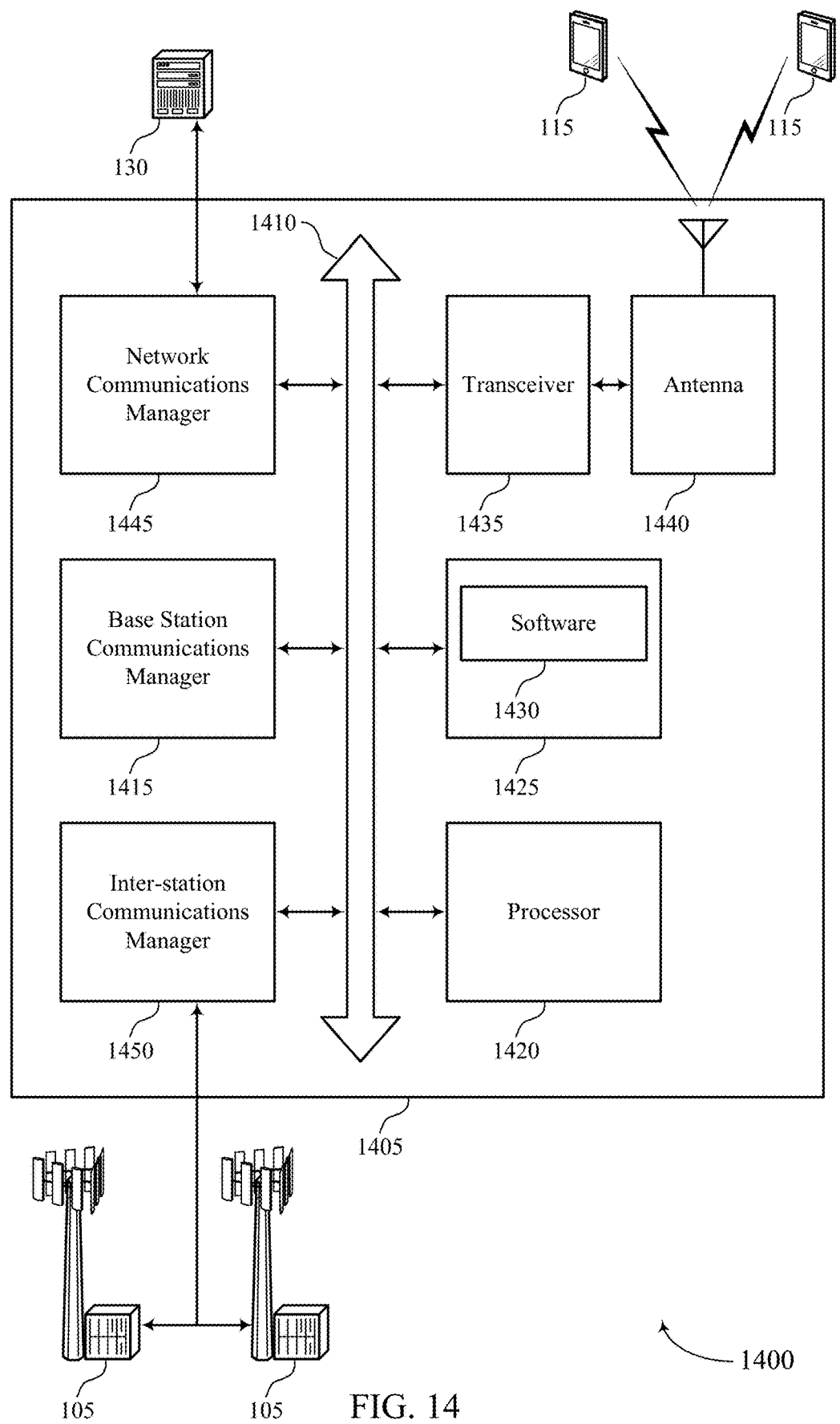
FIG. 14 illustrates a block diagram of a system including a base station that supports UCI in autonomous uplink in accordance with aspects of the present disclosure.

FIG. 14 shows a diagram of a system 1400 including a device 1405 that supports UCI in autonomous uplink in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting UCI in autonomous uplink).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support UCI in autonomous uplink. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas. In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an Long Term Evolution (LTE)/LTE-A wireless communication network technology to provide communication between base stations 105.

Figure 15:
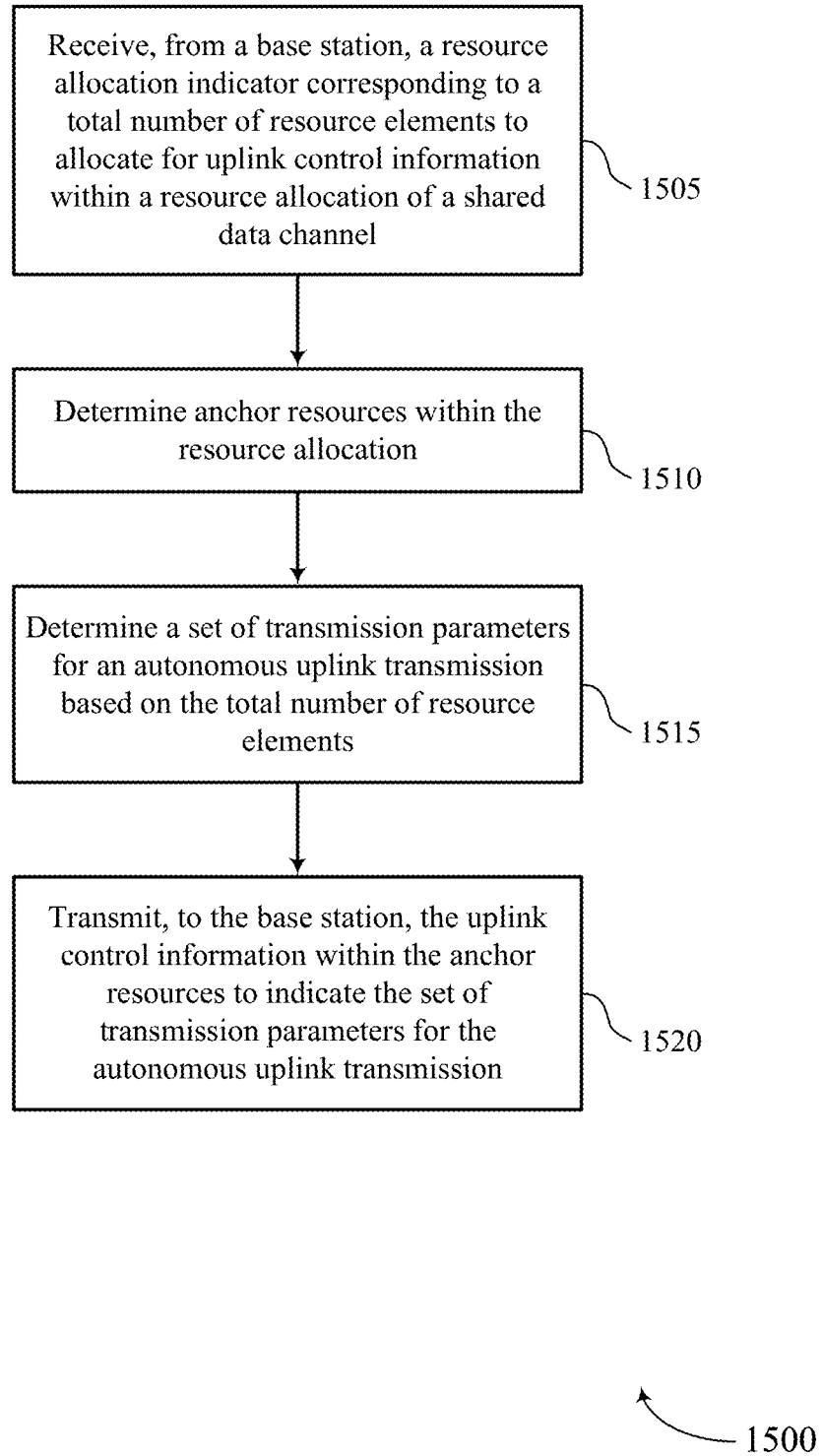
FIGS. 15 through 18 illustrate methods for UCI in autonomous uplink in accordance with aspects of the present disclosure.

FIG. 15 shows a flowchart illustrating a method 1500 for UCI in autonomous uplink in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive, from a base station 105, a resource allocation indicator corresponding to a total number of resource elements to allocate for uplink control information within a resource allocation of a shared data channel. The operations of 1505 may be performed according to the methods described herein. In certain examples, aspects of the operations of 1505 may be performed by a receiver as described with reference to FIGS. 7 through 10.

At 1510 the UE 115 may determine anchor resources within the resource allocation. The operations of 1510 may be performed according to the methods described herein. In certain examples, aspects of the operations of 1510 may be performed by a resource component as described with reference to FIGS. 7 through 10.

At 1515 the UE 115 may determine a plurality of transmission parameters for an autonomous uplink transmission based at least in part on the total number of resource elements. The operations of 1515 may be performed according to the methods described herein. In certain examples, aspects of the operations of 1515 may be performed by a parameter component as described with reference to FIGS. 7 through 10.

At 1520 the UE 115 may transmit, to the base station 105, the uplink control information within the anchor resources to indicate the plurality of transmission parameters for the autonomous uplink transmission. The operations of 1520 may be performed according to the methods described herein. In certain examples, aspects of the operations of 1520 may be performed by a transmitter as described with reference to FIGS. 7 through 10.

Figure 16:
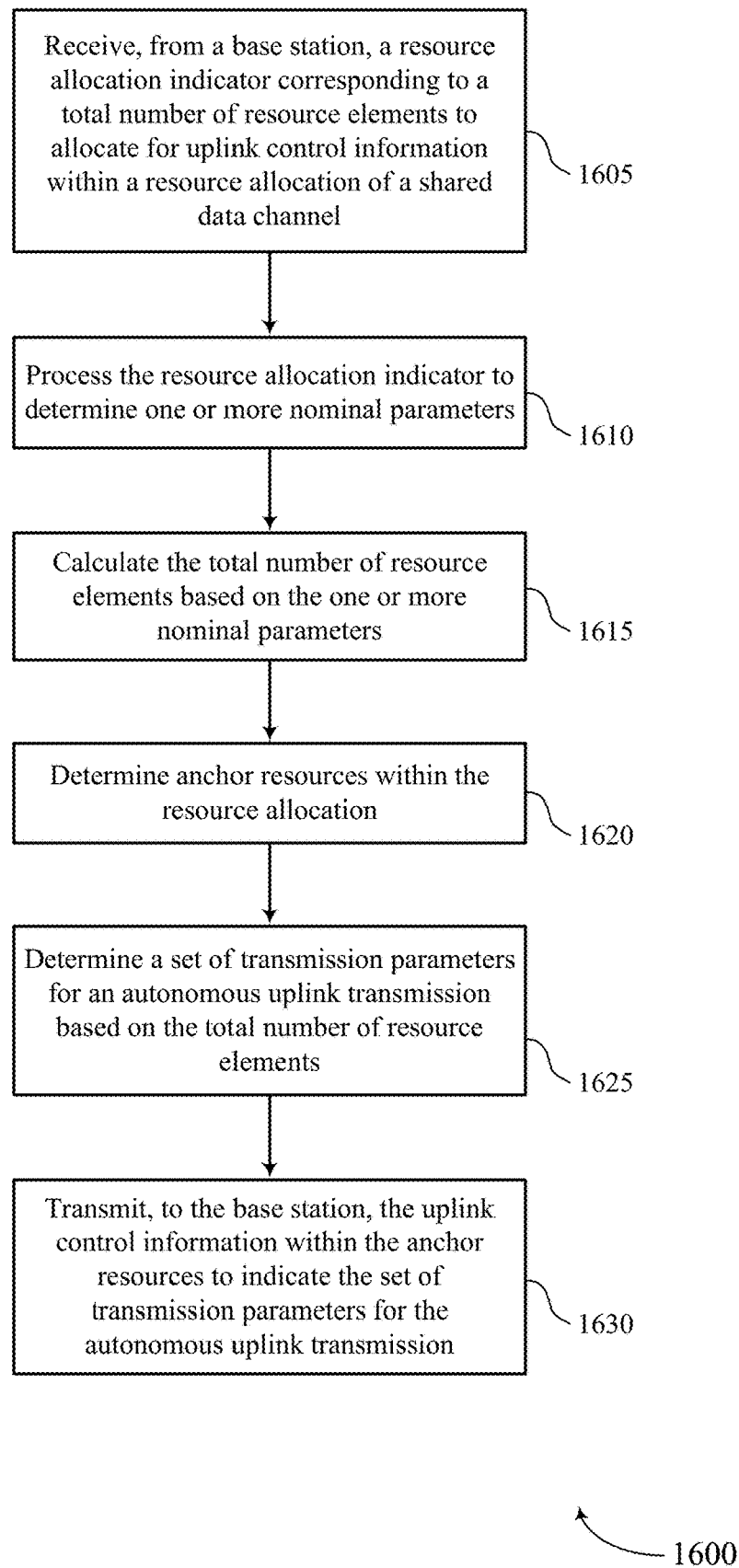

FIG. 16 shows a flowchart illustrating a method 1600 for UCI in autonomous uplink in accordance with aspects of the present disclosure. The operations of method 1600 may be implemented by a UE 115 or its components as described herein. For example, the operations of method 1600 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may receive, from a base station 105, a resource allocation indicator corresponding to a total number of resource elements to allocate for uplink control information within a resource allocation of a shared data channel. The operations of 1605 may be performed according to the methods described herein. In certain examples, aspects of the operations of 1605 may be performed by a receiver as described with reference to FIGS. 7 through 10.

At 1610 the UE 115 may process the resource allocation indicator to determine one or more nominal parameters. The operations of 1610 may be performed according to the methods described herein. In certain examples, aspects of the operations of 1610 may be performed by a resource component as described with reference to FIGS. 7 through 10.

At 1615 the UE 115 may calculate the total number of resource elements based at least in part on the one or more nominal parameters. The operations of 1615 may be performed according to the methods described herein. In certain examples, aspects of the operations of 1615 may be performed by a resource component as described with reference to FIGS. 7 through 10.

At 1620 the UE 115 may determine anchor resources within the resource allocation. The operations of 1620 may be performed according to the methods described herein. In certain examples, aspects of the operations of 1620 may be performed by a resource component as described with reference to FIGS. 7 through 10.

At 1625 the UE 115 may determine a plurality of transmission parameters for an autonomous uplink transmission based at least in part on the total number of resource elements. The operations of 1625 may be performed according to the methods described herein. In certain examples, aspects of the operations of 1625 may be performed by a parameter component as described with reference to FIGS. 7 through 10.

At 1630 the UE 115 may transmit, to the base station 105, the uplink control information within the anchor resources to indicate the plurality of transmission parameters for the autonomous uplink transmission. The operations of 1630 may be performed according to the methods described herein. In certain examples, aspects of the operations of 1630 may be performed by a transmitter as described with reference to FIGS. 7 through 10.

Figure 17:
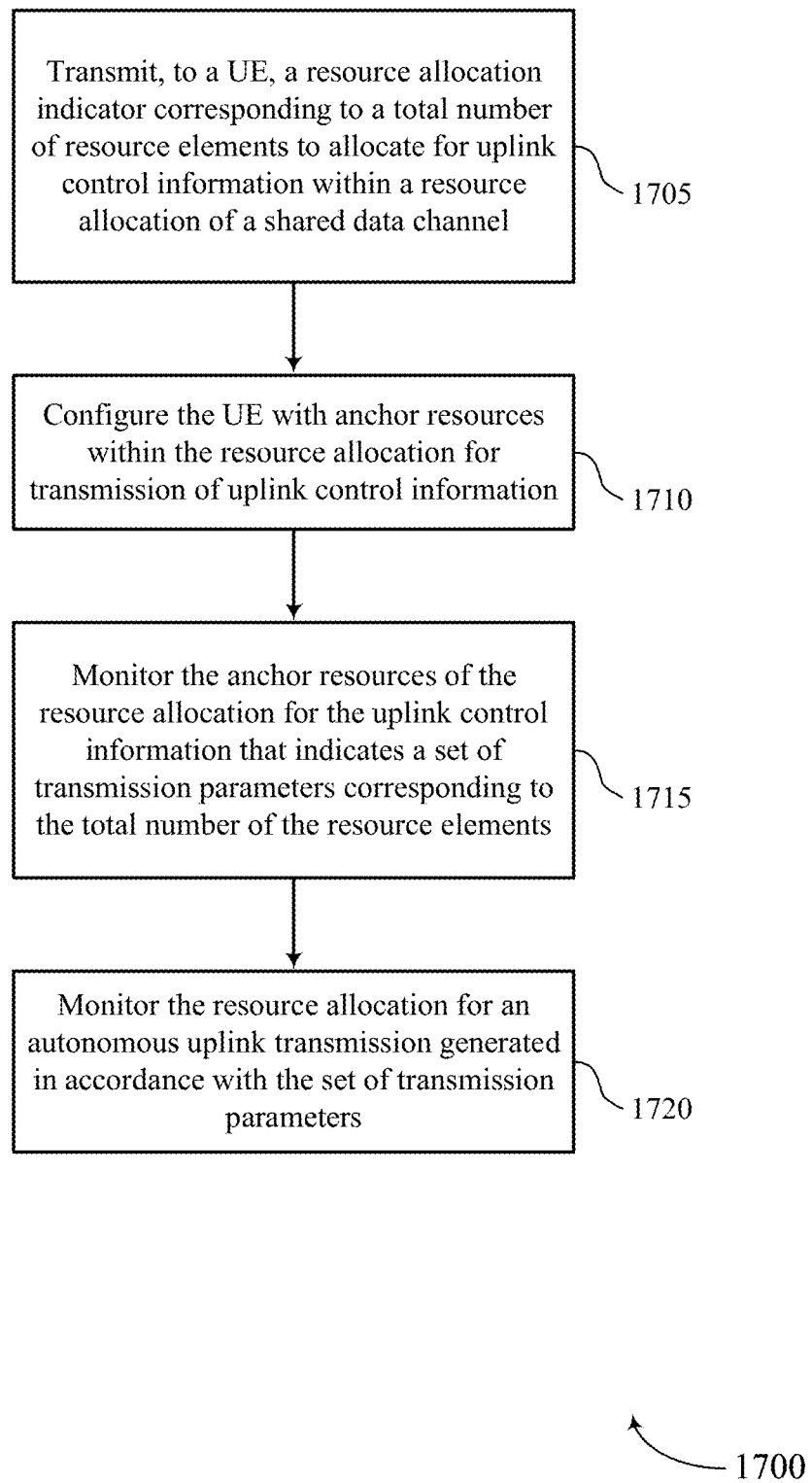

FIG. 17 shows a flowchart illustrating a method 1700 for UCI in autonomous uplink in accordance with aspects of the present disclosure. The operations of method 1700 may be implemented by a base station 105 or its components as described herein. For example, the operations of method 1700 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may transmit, to a UE 115, a resource allocation indicator corresponding to a total number of resource elements to allocate for uplink control information within a resource allocation of a shared data channel. The operations of 1705 may be performed according to the methods described herein. In certain examples, aspects of the operations of 1705 may be performed by a transmitter as described with reference to FIGS. 11 through 14.

At 1710 the base station 105 may configure the UE 115 with anchor resources within the resource allocation for transmission of uplink control information. The operations of 1710 may be performed according to the methods described herein. In certain examples, aspects of the operations of 1710 may be performed by a resource component as described with reference to FIGS. 11 through 14.

At 1715 the base station 105 may monitor the anchor resources of the resource allocation for the uplink control information that indicates a plurality of transmission parameters corresponding to the total number of the resource elements. The operations of 1715 may be performed according to the methods described herein. In certain examples, aspects of the operations of 1715 may be performed by a monitoring component as described with reference to FIGS. 11 through 14.

At 1720 the base station 105 may monitor the resource allocation for an autonomous uplink transmission generated in accordance with the plurality of transmission parameters. The operations of 1720 may be performed according to the methods described herein. In certain examples, aspects of the operations of 1720 may be performed by a monitoring component as described with reference to FIGS. 11 through 14.

Figure 18:
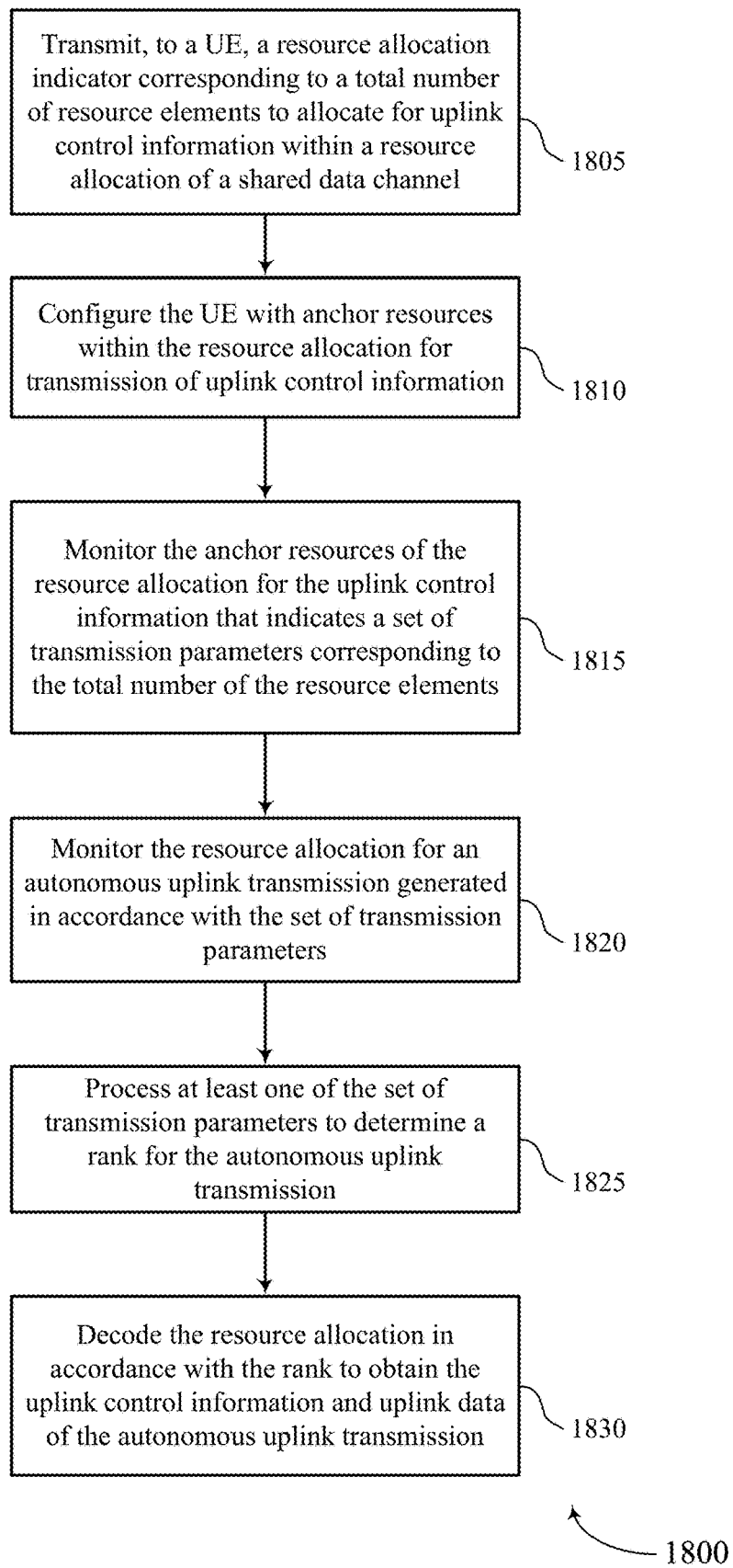

FIG. 18 shows a flowchart illustrating a method 1800 for UCI in autonomous uplink in accordance with aspects of the present disclosure. The operations of method 1800 may be implemented by a base station 105 or its components as described herein. For example, the operations of method 1800 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may transmit, to a UE 115, a resource allocation indicator corresponding to a total number of resource elements to allocate for uplink control information within a resource allocation of a shared data channel. The operations of 1805 may be performed according to the methods described herein. In certain examples, aspects of the operations of 1805 may be performed by a transmitter as described with reference to FIGS. 11 through 14.

At 1810 the base station 105 may configure the UE 115 with anchor resources within the resource allocation for transmission of uplink control information. The operations of 1810 may be performed according to the methods described herein. In certain examples, aspects of the operations of 1810 may be performed by a resource component as described with reference to FIGS. 11 through 14.

At 1815 the base station 105 may monitor the anchor resources of the resource allocation for the uplink control information that indicates a plurality of transmission parameters corresponding to the total number of the resource elements. The operations of 1815 may be performed according to the methods described herein. In certain examples, aspects of the operations of 1815 may be performed by a monitoring component as described with reference to FIGS. 11 through 14.

At 1820 the base station 105 may monitor the resource allocation for an autonomous uplink transmission generated in accordance with the plurality of transmission parameters. The operations of 1820 may be performed according to the methods described herein. In certain examples, aspects of the operations of 1820 may be performed by a monitoring component as described with reference to FIGS. 11 through 14.

At 1825 the base station 105 may process at least one of the plurality of transmission parameters to determine a rank for the autonomous uplink transmission. The operations of 1825 may be performed according to the methods described herein. In certain examples, aspects of the operations of 1825 may be performed by a rank component as described with reference to FIGS. 11 through 14.

At 1830 the base station 105 may decode the resource allocation in accordance with the rank to obtain the uplink control information and uplink data of the autonomous uplink transmission. The operations of 1830 may be performed according to the methods described herein. In certain examples, aspects of the operations of 1830 may be performed by a decoding component as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
    receiving, from a base station, a resource allocation indicator corresponding to a total number of resource elements to allocate for uplink control information within a resource allocation of a shared data channel;
    determining anchor resources within the resource allocation;
    determining a plurality of transmission parameters for an autonomous uplink transmission based at least in part on the total number of resource elements; and
    transmitting, to the base station, the uplink control information within the anchor resources to indicate the plurality of transmission parameters for the autonomous uplink transmission.

2. The method of claim 1, further comprising:
    generating the autonomous uplink transmission in accordance with the plurality of transmission parameters; and
    transmitting the autonomous uplink transmission within the resource allocation.

3. The method of claim 1, further comprising:
    processing the resource allocation indicator to determine one or more nominal parameters; and
    calculating the total number of resource elements based at least in part on the one or more nominal parameters.

4. The method of claim 1, wherein the resource allocation indicator specifies the total number of resource elements.

5. The method of claim 1, wherein the resource allocation indicator specifies an aggregation level of a plurality of different aggregation levels for transmitting the uplink control information to indicate the total number of resource elements.

6. The method of claim 1, further comprising:
receiving configuration information indicating the anchor resources within the resource allocation.

7. The method of claim 6, wherein the resource allocation corresponds to a plurality of symbol periods within a plurality of resource blocks, and wherein the anchor resources correspond to a subset of the plurality of resource blocks and a subset of the plurality of symbol periods.

8. The method of claim 1, wherein the plurality of transmission parameters indicate a modulation and coding scheme (MCS), or a modulation type, or a rank indicator (RI), or at least a portion of the resource allocation being utilized, or a precoding matrix indicator (PMI), or a waveform type, or any combination thereof, for the autonomous uplink transmission.

9. The method of claim 1, further comprising:
adjusting one or more transmission parameters of the plurality of transmission parameters; and
transmitting the autonomous uplink transmission in accordance with the adjusted one or more transmission parameters.

10. The method of claim 9, wherein adjusting the one or more transmission parameters comprises:
adjusting the one or more transmission parameters based at least in part on a link quality measurement, or an amount of uplink data available to send in the autonomous uplink transmission, or power headroom, or any combination thereof.

11. The method of claim 1, wherein at least one of the plurality of transmission parameters indicates that the autonomous uplink transmission is transmitted using a portion of the resource allocation.

12. The method of claim 1, further comprising:
modulating the uplink control information with quadrature phase shift keying (QPSK) modulation.

13. The method of claim 12, wherein the uplink control information is QPSK modulated using a first sub-constellation of a data modulation constellation, and that uplink data of the autonomous uplink transmission is modulated using a modulation order indicated in the uplink control information.

14. The method of claim 1, wherein transmitting the uplink control information further comprises:
transmitting the uplink control information in accordance with a defined rank.

15. The method of claim 1, further comprising:
selecting a rank for the autonomous uplink transmission; and
transmitting the autonomous uplink transmission that is generated in accordance with the selected rank and the plurality of transmission parameters, wherein the uplink control information is transmitted in accordance with the selected rank and at least one of the plurality of transmission parameters indicates the selected rank.

16. The method of claim 1, further comprising:
transmitting, in accordance with the plurality of transmission parameters, the autonomous uplink transmission as an orthogonal frequency division multiplexing (OFDM) waveform or a single carrier frequency division multiplexing (SC-FDM) waveform.

17. A method for wireless communication by a base station, comprising:
transmitting, to a user equipment (UE), a resource allocation indicator corresponding to a total number of resource elements to allocate for uplink control information within a resource allocation of a shared data channel;
configuring the UE with anchor resources within the resource allocation for transmission of uplink control information;
monitoring the anchor resources of the resource allocation for the uplink control information that indicates a plurality of transmission parameters corresponding to the total number of the resource elements; and
monitoring the resource allocation for an autonomous uplink transmission generated in accordance with the plurality of transmission parameters.

18. The method of claim 17, wherein the resource allocation indicator specifies the total number of resource elements.

19. The method of claim 17, wherein the resource allocation indicator comprises one or more nominal parameters.

20. The method of claim 17, wherein the resource allocation indicator specifies an aggregation level of a plurality of different aggregation levels for transmitting the uplink control information.

21. The method of claim 17, wherein monitoring the resource allocation for the autonomous uplink transmission comprises:
extracting tones from the anchor resources to obtain the uplink control information.

22. The method of claim 17, wherein monitoring for the autonomous uplink transmission comprises:
blinding decoding the anchor resources in accordance with a plurality of decoding hypotheses to obtain the uplink control information.

23. The method of claim 17, wherein the uplink control information is modulated using quadrature phase shift keying (QPSK) modulation.

24. The method of claim 23, wherein the uplink control information is QPSK modulated using a first sub-constellation of a data modulation constellation, and that uplink data of the autonomous uplink transmission is modulated using a modulation order indicated in the uplink control information.

25. The method of claim 17, further comprising:
processing at least one of the plurality of transmission parameters to determine a rank for the autonomous uplink transmission; and
decoding the resource allocation in accordance with the rank to obtain the uplink control information and uplink data of the autonomous uplink transmission.

26. The method of claim 17, wherein monitoring the resource allocation for the autonomous uplink transmission comprises:
receiving the autonomous uplink transmission as an orthogonal frequency division multiplexing (OFDM) waveform or a single carrier frequency division multiplexing (SC-FDM) waveform.

27. An apparatus for wireless communication, comprising: a processor; memory in electronic communication with the processor; and instructions stored in the memory and executable by the processor to cause the apparatus to:
receive, from a base station, a resource allocation indicator corresponding to a total number of resource elements to allocate for uplink control information within a resource allocation of a shared data channel;
determine anchor resources within the resource allocation;

determine a plurality of transmission parameters for an autonomous uplink transmission based at least in part on the total number of resource elements; and transmit, to the base station, the uplink control information within the anchor resources to indicate the plurality of transmission parameters for the autonomous uplink transmission.

28. The apparatus of claim 27, wherein the instructions are further executable by the processor to cause the apparatus to:

generate the autonomous uplink transmission in accordance with the plurality of transmission parameters; and transmit the autonomous uplink transmission within the resource allocation.

29. The apparatus of claim 27, wherein the instructions are further executable by the processor to cause the apparatus to:

process the resource allocation indicator to determine one or more nominal parameters; and calculate the total number of resource elements based at least in part on the one or more nominal parameters.

30. An apparatus for wireless communication, comprising: a processor; memory in electronic communication with the processor; and instructions stored in the memory and executable by the processor to cause the apparatus to:

transmit, to a user equipment (UE), a resource allocation indicator corresponding to a total number of resource elements to allocate for uplink control information within a resource allocation of a shared data channel;

configure the UE with anchor resources within the resource allocation for transmission of uplink control information;

monitor the anchor resources of the resource allocation for the uplink control information that indicates a plurality of transmission parameters corresponding to the total number of the resource elements; and monitor the resource allocation for an autonomous uplink transmission generated in accordance with the plurality of transmission parameters.

* * * * *